(12) United States Patent
Ore et al.

(10) Patent No.: US 11,585,412 B1
(45) Date of Patent: Feb. 21, 2023

(54) ELECTRONICALLY-VARIABLE, DUAL-PATH POWER SHIFT TRANSMISSION FOR WORK VEHICLES

(71) Applicant: Deere & Company, Moline, IL (US)

(72) Inventors: Thomas G. Ore, Cedar Falls, IA (US); Clement V. Godbold, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/559,693

(22) Filed: Dec. 22, 2021

(51) Int. Cl.
*F16H 3/72* (2006.01)
*F16H 3/00* (2006.01)

(52) U.S. Cl.
CPC ............. *F16H 3/006* (2013.01); *F16H 3/727* (2013.01); *F16H 2003/008* (2013.01); *F16H 2200/006* (2013.01); *F16H 2200/0026* (2013.01); *F16H 2200/2035* (2013.01)

(58) Field of Classification Search
CPC . F16H 3/006; F16H 3/72; F16H 3/727; F16H 2003/008; F16H 2200/0026; F16H 2200/006; F16H 2200/2035; F16H 37/046; F16H 37/0833
See application file for complete search history.

(56) References Cited

U.S. PATENT DOCUMENTS

| | | | |
|---|---|---|---|
| 3,214,987 A | 11/1965 | Schenck et al. | |
| 3,626,787 A | 12/1971 | Singer | |
| 3,651,904 A | 3/1972 | Snoy | |
| 3,714,845 A | 2/1973 | Mooney, Jr. | |
| 3,783,711 A | 1/1974 | Orshansky, Jr. | |
| 4,090,414 A | 5/1978 | White | |
| 4,164,155 A | 8/1979 | Reed et al. | |
| 4,164,156 A | 8/1979 | Reed | |
| 5,156,577 A | 10/1992 | Fredriksen et al. | |
| 5,277,286 A | 1/1994 | Yamamoto et al. | |

(Continued)

FOREIGN PATENT DOCUMENTS

| | | |
|---|---|---|
| AT | 11545 U1 | 12/2010 |
| CN | 101255907 A | 9/2008 |

(Continued)

OTHER PUBLICATIONS

German Search Report issued in application No. DE102021214746.1 with translation, dated Jun. 30, 2022. (25 pages).

(Continued)

*Primary Examiner* — Huan Le
(74) *Attorney, Agent, or Firm* — Klintworth & Rozenblat IP LLP

(57) ABSTRACT

A transmission includes an input assembly, an electric machine, a variator and a power shift assembly. The input assembly has directional clutches and is configured to receive rotational engine power. The variator has only a single planetary set configured to selectively receive rotational power from the electric machine and from the input assembly. The power shift assembly is configured to receive rotational power from the variator. Power shift clutches are configured to dissipate energy from asynchronous gear meshing and include a first power shift clutch carried by a first countershaft and a second power shift clutch carried by a second countershaft. The power shift assembly is configured to effect multiple different rotational power flows to effect unique gear ratios.

20 Claims, 11 Drawing Sheets

(56) References Cited

U.S. PATENT DOCUMENTS

| | | |
|---|---|---|
| 5,353,662 A | 10/1994 | Vaughters |
| 5,508,574 A | 4/1996 | Vlock |
| 5,931,757 A | 8/1999 | Schmidt |
| 6,254,509 B1 | 7/2001 | Meyer |
| 6,394,925 B1 | 5/2002 | Wontner et al. |
| 6,478,705 B1 | 11/2002 | Holmes et al. |
| 6,641,505 B2 | 11/2003 | Sayman et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,329,201 B2 | 2/2008 | Raghavan et al. |
| 7,367,911 B2 | 5/2008 | Raghavan et al. |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan et al. |
| 7,479,081 B2 | 1/2009 | Holmes |
| 7,491,144 B2 | 2/2009 | Conlon |
| 7,611,433 B2 * | 11/2009 | Forsyth .................. B60K 6/48 903/910 |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,439,787 B2 * | 5/2013 | Salamandra .......... F16H 37/046 74/330 |
| 8,469,127 B2 | 6/2013 | Tarasinski et al. |
| 8,500,585 B2 | 8/2013 | Kim et al. |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Tarasinski et al. |
| 8,734,281 B2 | 5/2014 | Ai et al. |
| 8,747,266 B2 | 6/2014 | Aitzetmueller et al. |
| 8,784,246 B2 | 7/2014 | Treichel et al. |
| 8,790,202 B2 | 7/2014 | Sakai et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,097,342 B2 * | 8/2015 | Dix ....................... F16H 61/472 |
| 9,206,885 B2 | 12/2015 | Rekow et al. |
| 9,487,073 B2 | 11/2016 | Love et al. |
| 9,562,592 B2 | 2/2017 | Rekow et al. |
| 9,840,165 B2 | 12/2017 | Cox |
| 9,840,827 B2 * | 12/2017 | Miyamoto ............ F16H 61/688 |
| 9,944,163 B2 | 4/2018 | McKinzie |
| 9,981,665 B2 | 5/2018 | Rekow et al. |
| 10,119,598 B2 | 11/2018 | Rekow et al. |
| 10,619,711 B2 | 4/2020 | Fliearman et al. |
| 10,647,193 B2 | 5/2020 | McKinzie et al. |
| 10,655,710 B2 | 5/2020 | Rekow et al. |
| 10,670,124 B2 | 6/2020 | Rekow et al. |
| 10,738,868 B2 | 8/2020 | McKinzie et al. |
| 10,975,959 B2 | 4/2021 | McKinzie et al. |
| 11,052,747 B2 | 7/2021 | Ore |
| 11,091,018 B2 | 8/2021 | Ore et al. |
| 11,137,052 B2 | 10/2021 | Ore et al. |
| 2001/0016536 A1 | 8/2001 | Minowa et al. |
| 2003/0186769 A1 | 10/2003 | Ai et al. |
| 2004/0094381 A1 | 5/2004 | Versteyhe |
| 2004/0172184 A1 | 9/2004 | Vukovich et al. |
| 2005/0036894 A1 | 2/2005 | Oguri |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2008/0171626 A1 | 7/2008 | Pollman |
| 2009/0250278 A1 | 10/2009 | Kawasaki et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller et al. |
| 2013/0023370 A1 | 1/2013 | Grad |
| 2013/0123055 A1 | 5/2013 | Mattsson et al. |
| 2013/0173126 A1 | 7/2013 | Ruebsam |
| 2013/0211655 A1 | 8/2013 | Ogata et al. |
| 2013/0231815 A1 | 9/2013 | Tanishima et al. |
| 2013/0325238 A1 | 12/2013 | Kato et al. |
| 2014/0018201 A1 | 1/2014 | Tolksdorf |
| 2014/0248986 A1 | 4/2014 | Weeramantry et al. |
| 2014/0128196 A1 | 5/2014 | Rintoo |
| 2014/0128217 A1 | 5/2014 | Tabata et al. |
| 2014/0315685 A1 | 10/2014 | Hofler |
| 2015/0006007 A1 | 1/2015 | Kitahata et al. |
| 2015/0072823 A1 | 3/2015 | Rintoo |
| 2015/0142232 A1 | 5/2015 | Tabata et al. |
| 2015/0142282 A1 | 5/2015 | Lee et al. |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1 | 9/2016 | Watanabe et al. |
| 2017/0066447 A1 | 3/2017 | Hertel et al. |
| 2017/0102059 A1 | 4/2017 | Rekow et al. |
| 2017/0129477 A1 | 5/2017 | Ideshio et al. |
| 2017/0203646 A1 | 7/2017 | Mueller et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0022353 A1 | 1/2018 | Thompson et al. |
| 2018/0043764 A1 | 2/2018 | McKinzie et al. |
| 2018/0056982 A1 | 3/2018 | Endo et al. |
| 2018/0149247 A1 | 5/2018 | Rekow et al. |
| 2018/0298993 A1 | 10/2018 | Fliearman et al. |
| 2019/0118642 A1 | 4/2019 | Cho et al. |
| 2019/0337376 A1 | 11/2019 | Ore |
| 2019/0344654 A1 | 11/2019 | Kaltenbach et al. |
| 2019/0346036 A1 | 11/2019 | Ore et al. |
| 2019/0389298 A1 | 12/2019 | Kaltenbach et al. |
| 2020/0309258 A1 | 10/2020 | McKinzie et al. |
| 2021/0062900 A1 | 3/2021 | Ore et al. |

FOREIGN PATENT DOCUMENTS

| | | |
|---|---|---|
| CN | 102844588 A | 12/2012 |
| DE | 1173348 B | 7/1964 |
| DE | 4010919 A1 | 10/1991 |
| DE | 4131572 A1 | 3/1993 |
| DE | 19621200 A1 | 11/1997 |
| DE | 19954636 A1 | 5/2001 |
| DE | 201500200973 | 5/2001 |
| DE | 10128076 A1 | 12/2002 |
| DE | 10319252 A1 | 11/2004 |
| DE | 102006041160 A1 | 9/2008 |
| DE | 102008032320 A1 | 1/2010 |
| DE | 202009007972 U1 | 5/2010 |
| DE | 10201102210 A1 | 3/2011 |
| DE | 10201105868 | 3/2011 |
| DE | 102010026460 A1 | 3/2011 |
| DE | 102010021846 A1 | 12/2011 |
| DE | 102011102184 A1 | 7/2012 |
| DE | 112006002537 B4 | 8/2012 |
| DE | 102012216781 A1 | 3/2013 |
| DE | 102011115002 A1 | 4/2013 |
| DE | 102013009649 A1 | 12/2014 |
| DE | 102013220167 A1 | 4/2015 |
| DE | 202015102282 U1 | 5/2015 |
| DE | 102014225298 A1 | 7/2015 |
| DE | 102015215461 A1 | 2/2016 |
| DE | 102015220635 A1 | 5/2016 |
| DE | 102015205932 A1 | 10/2016 |
| DE | 112006000524 B4 | 2/2017 |
| DE | 102016116324 A1 | 3/2017 |
| DE | 102016120965 A1 | 5/2017 |
| DE | 102016204727 A1 | 9/2017 |
| DE | 102018108510 A1 | 10/2018 |

(56) References Cited

FOREIGN PATENT DOCUMENTS

| | | |
|---|---|---|
| DE | 102018209940 A1 | 12/2018 |
| DE | 102018212712 A1 | 1/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020215219 A1 | 6/2021 |
| EP | 01099882 A2 | 10/1991 |
| EP | 805059 A2 | 11/1997 |
| EP | 01707416 | 8/2007 |
| EP | 02855226 | 8/2007 |
| EP | 02466168 | 6/2012 |
| EP | 02466169 | 6/2012 |
| EP | 2631144 B1 | 8/2013 |
| EP | 2682531 A1 | 1/2014 |
| EP | 2832567 A1 | 2/2015 |
| JP | 6462174 B1 | 11/1997 |
| WO | 2007017975 A1 | 2/2007 |
| WO | 2008019799 A2 | 2/2008 |
| WO | 2011092643 A1 | 8/2011 |
| WO | 2012171812 A1 | 12/2012 |
| WO | 2017107848 A1 | 6/2017 |

OTHER PUBLICATIONS

USPTO, Non-Final Office Action issued in U.S. Appl. No. 17/154,729 dated Jul. 15, 2022. (7 pages).
German Search Report issued in application No. DE102021209495.3 with translation, dated Jan. 11, 2022 (24 pages).
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
Deere & Company, Utility U.S. Appl. No. 16/670,210, filed Oct. 31, 2019.
Deere & Company, Utility U.S. Appl. No. 16/946,685, filed Jul. 1, 2020.
Deere & Company, Utility U.S. Appl. No. 17/066,746, filed Oct. 9, 2020.
Deere & Company, Utility U.S. Appl. No. 17/154,729, filed Jan. 21, 2021.
Deere & Company, Utility U.S. Appl. No. 17/171,856, filed Feb. 9, 2021.
CNIPA Office Action for Application No. 201510165982.4 dated Aug. 9, 2018, Serial Notice No. 2018080601675890.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.
German Search Report for application No. 102018212712 dated Apr. 12, 2019.
German Search Report for application No. 102019205211 dated Sep. 5, 2019.
German Search Report for application No. 102019204706 dated Dec. 17, 2019.
German Search Report for German application No. 1020202026513 dated Sep. 1, 2020.
German Search Report issued in application No. 102020213675.0 dated Mar. 17, 2021. (10 pages).
German Search Report issued in counterpart application No. 102020209003.3 dated Apr. 15, 2021 (10 pages).
German Search Report issued in counterpart application No. 102017220666.7 dated May 28, 2021. (10 pages).
Extended European Search Report issued in counterpart application No. 20205965.5 dated Jul. 28, 2021. (10 pages).
USPTO, Office Action in U.S. Appl. No. 14/249,258 dated Apr. 21, 2017.
USPTO, Office Action in U.S. Appl. No. 15/664,289 dated Dec. 13, 2018.
USPTO, Final Office Action in U.S. Appl. No. 15/971,867 dated Jun. 24, 2020.
USPTO, Final Office Action issued in U.S. Appl. No. 16/555,913 dated Apr. 20, 2021.
USPTO, Office Action in U.S. Appl. No. 14/249,258 dated Aug. 22, 2017.
USPTO, Office Action in U.S. Appl. No. 14/249,258 dated Oct. 17, 2016.
USPTO, Office Action in U.S. Appl. No. 14/536,097 dated Sep. 25, 2017.
USPTO, Office Action in U.S. Appl. No. 15/485,911 dated Feb. 8, 2019.
USPTO, Office Action in U.S. Appl. No. 15/628,979 dated Nov. 5, 2019.
USPTO, Office Action in U.S. Appl. No. 15/664,289 dated Jul. 26, 2018.
USPTO, Office Action in U.S. Appl. No. 15/793,522 dated Apr. 18, 2019.
USPTO, Office Action in U.S. Appl. No. 15/879,796 dated Aug. 23, 2019.
USPTO, Office Action in pending U.S. Appl. No. 15/971,867 dated Dec. 12, 2019.
USPTO, Office Action in U.S. Appl. No. 16/371,598 dated Jul. 21, 2020.
USPTO, Office Action in U.S. Appl. No. 16/555,913 dated Jan. 4, 2021.
USPTO, Office Action in U.S. Appl. No. 17/066,746 dated Oct. 26, 2021.
Deere & Company, Utility U.S. Appl. No. 17/538,691, filed Nov. 30, 2021.
German Search Report issued in application No. DE102021212506.9 with translation, dated Jun. 20, 2022. (24 pages).
USPTO, Ex Parte Quayle Action issued in U.S. Appl. No. 17/171,856 dated Oct. 11, 2022.
USPTO, Non-Final Office Action issued in U.S. Appl. No. 17/559,496 dated Aug. 31, 2022.
USPTO, Non-Final Office Action issued in U.S. Appl. No. 17/538,691 dated Sep. 15, 2022.

* cited by examiner

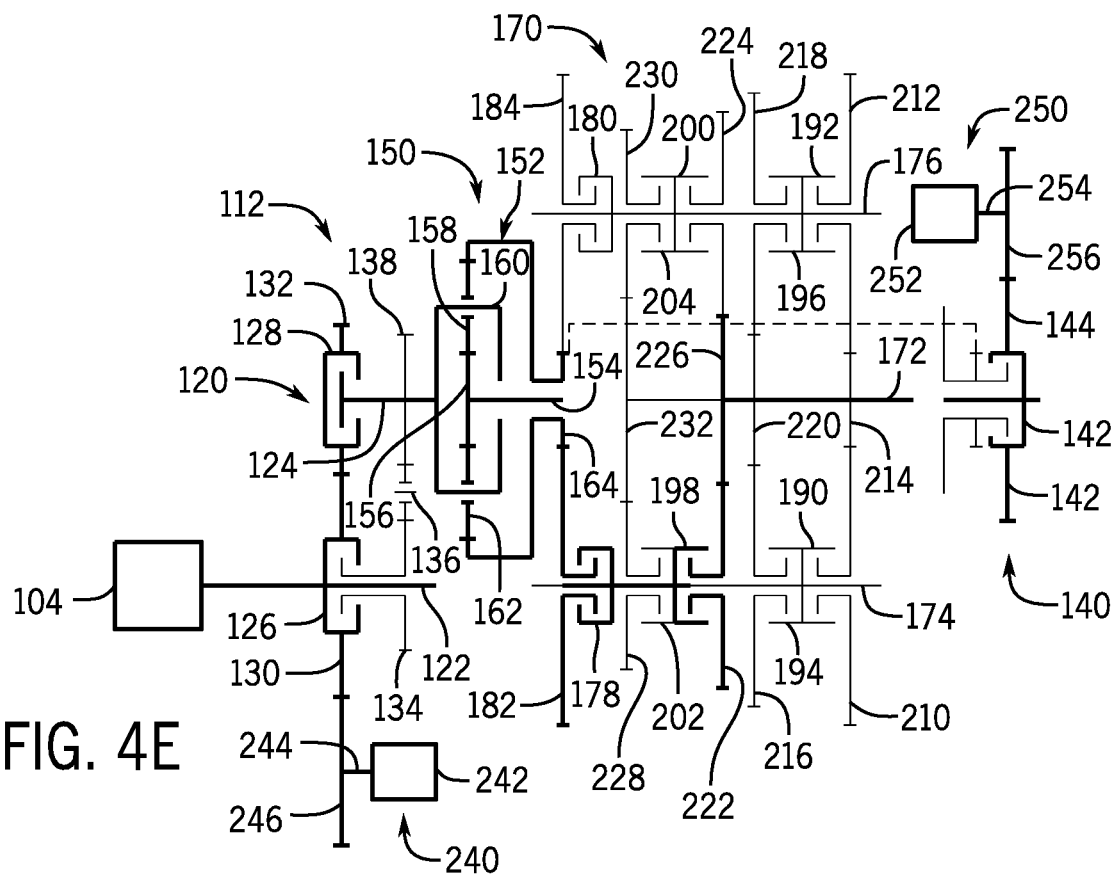

ELECTRONICALLY-VARIABLE, DUAL-PATH POWER SHIFT TRANSMISSION FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to transmission systems for work vehicles.

BACKGROUND OF THE DISCLOSURE

Work vehicle transmissions may incorporate continuously or infinitely variable power sources, such as electric machines or hydraulic drives, to supplement or supplant mechanical power from a primary power plant, such a diesel engine, to provide tractive power to the machine through some or all of its travel range. Such transmissions may operate in multiple modes, including one or more modes using only conventional mechanical (e.g., engine) power or only supplemental (e.g., electric) power. Such transmissions may also incorporate planetary arrangements to combine the multiple power sources. The single or combined power is delivered to a gear ratio changing assembly to further effect different operational modes. From there, the power is delivered to various power sinks or other downstream components of the vehicle drivetrain (e.g., additional gear ratio changing assemblies, differential devices, final or other drives, ground-engaging wheels or tracks, and so on).

SUMMARY OF THE DISCLOSURE

The invention provides an electronically-variable, dual-path power shift transmission for work vehicles.

Specifically, in one aspect the invention is a transmission for a work vehicle comprising an input assembly, an electric machine, a variator and a power shift assembly. The input assembly has directional clutches and is configured to receive rotational power from an engine of the work vehicle. The variator includes only a single planetary set configured to selectively receive rotational power from the electric machine and from the input assembly. The power shift assembly is configured to receive rotational power from the variator and has parallel countershafts, including a first countershaft and a second countershaft, an output shaft parallel with the countershafts, speed gears carried by the countershafts and the output shaft, and power shift clutches configured to dissipate energy from asynchronous gear meshing. The power shift clutches include a first power shift clutch carried by the first countershaft and a second power shift clutch carried by the second countershaft. The power shift assembly is configured to effect multiple different rotational power flows from meshing a set of the speed gears at each shift of the power shift assembly to effect a unique one of multiple gear ratios, which include a first of the multiple different rotational power flows flowing through the first power shift clutch and the first countershaft without flowing through the second power shift clutch and the second countershaft, and a second of the multiple different rotational power flows flowing through the second power shift clutch and the second countershaft without flowing through the first power shift clutch and the first countershaft.

In another aspect, the invention is a transmission for a work vehicle comprising an input assembly, an electric machine, a variator and a power shift assembly. The input assembly has directional clutches and is configured to receive rotational power from an engine of the work vehicle. The variator includes only a single planetary set configured to selectively receive rotational power from the electric machine and the input assembly. The variator is configured to sum the rotational power from the electric machine and from the engine to provide a split-path rotational power. The power shift assembly is configured to receive the rotational split-path power from the variator and has parallel countershafts, including a first countershaft and a second countershaft, an output shaft parallel with the countershafts, speed gears carried by the countershafts and the output shaft, and power shift clutches configured to dissipate energy from asynchronous gear meshing. The power shift clutches include a first power shift clutch carried by the first countershaft and a second power shift clutch carried by the second countershaft. The power shift assembly is configured to effect multiple different rotational power flows from meshing a set of the speed gears at each shift of the power shift assembly to effect a unique one of multiple gear ratios, which include a first of the multiple different rotational power flows flowing through the first power shift clutch and the first countershaft without flowing through the second power shift clutch and the second countershaft, and a second of the multiple different rotational power flows flowing through the second power shift clutch and the second countershaft without flowing through the first power shift clutch and the first countershaft. Each consecutive shift of the power shift assembly has a gear ratio step delta that varies by less than five percent.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIGS. 4A-4H are schematic views of the multi-mode continuously variable power shift transmission of FIG. 2 depicting the power flows in various forward modes according to example embodiments of the present disclosure.

Figure 1:
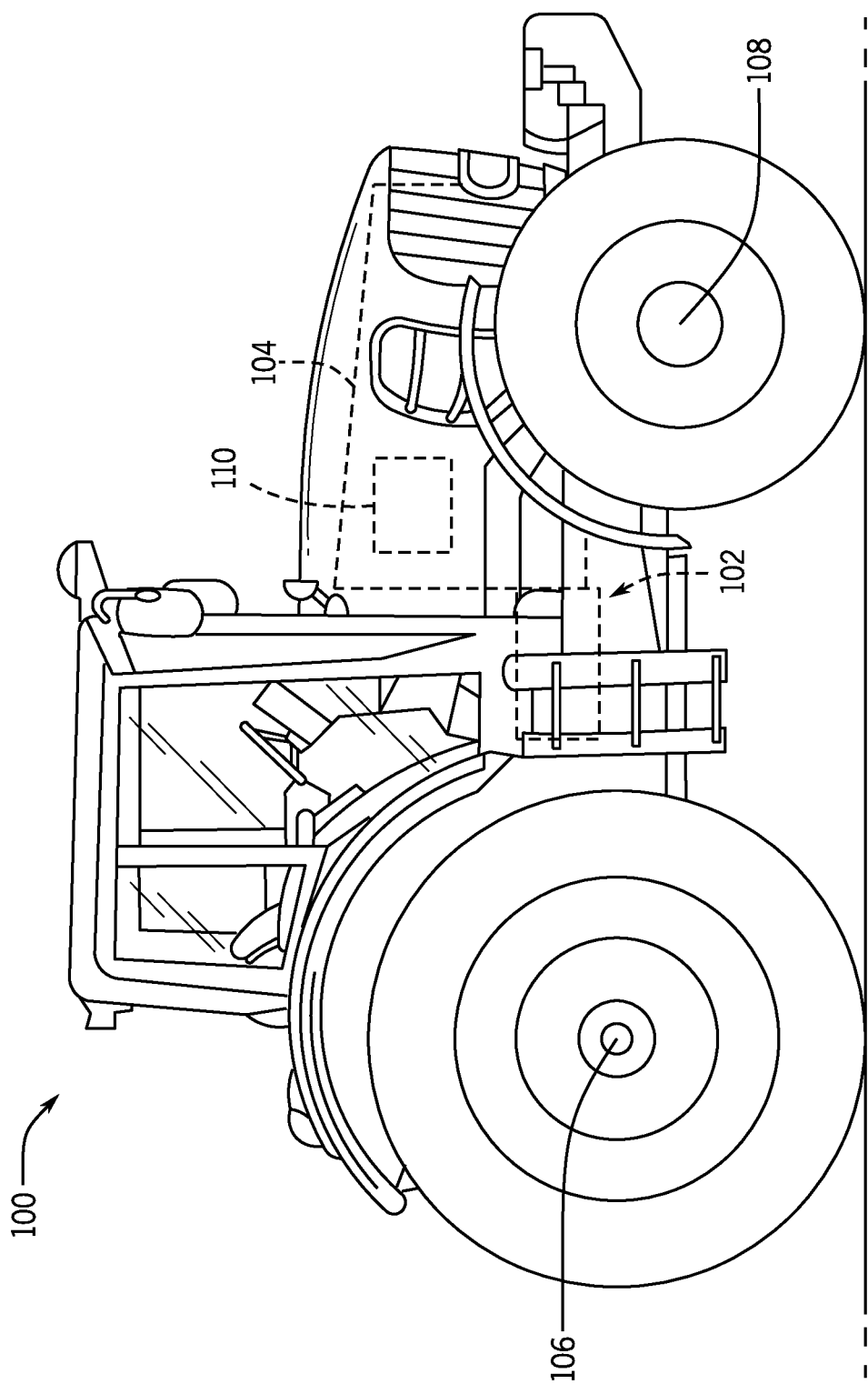
FIG. 1 schematically illustrates a work vehicle in the form of an agricultural tractor that may implement a variable power shift transmission, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As noted above, work vehicles transmissions may incorporate continuously or infinitely variable power sources, such as electric machines or hydraulic drives, to supplement or supplant mechanical power from a primary power plant, such a diesel engine, to provide tractive power to the machine through some or all of its travel range. Such transmissions may operate in multiple modes, including one or more modes using only engine power or only electric power. Such transmissions may also incorporate planetary arrangements to combine the multiple power sources. The single or combined power is delivered to a gear ratio changing assembly to further effect different operational modes in which power is delivered to various power sinks or other downstream components of the vehicle drivetrain. Generally, in the discussion below, the term "engaged" refers to transmission components that are in positions to transfer power between such components (e.g., enmeshed gears or frictionally engaged clutch portions); and the term "fixedly coupled" generally refers to transmission components that rotate with one another.

At present, conventional gear ratio changing assemblies employed with such transmissions require synchronous shifts at specific shift points to effect different operational modes of the transmission. This reduces the flexibility of the drivetrain and limits the ability of the transmission control logic to effect a wide range of travel speeds while maintaining a single transmission gear ratio (i.e., without requiring up or down shifts). This limitation is not resolved by the use of downstream power-shift gear ratio changing assembly. Further, power shift assemblies of conventional design may have a large-quantity gear train, often including integer multiples of gears and clutches as compared to the resulting operational modes. This may come at significant cost and complexity, require one or more additional shifts for a given power band, and necessitate higher capacity components, especially the supplemental power sources. All of this may further impact and exacerbate space envelope constraints for a given work vehicle.

Disclosed herein is an electronically variable powershift transmission for work vehicles. The transmission includes as primary components a variator device, an electric machine, such an electric motor, and a power shift arrangement with gears and clutches capable of consuming energy from asynchronous gear meshes. The power shift arrangement affords the flexibility of gear meshes without the need to synchronize the rotating gears and also permits control strategies that vary the shift points between operating modes, and even to forego shifts entirely, thereby remaining in the same mode for ranges of speeds of the vehicle. The power shift assembly may provide for wide power bands, in certain cases allowing for the speed to double from the low to the high end of the power band in each mode.

An input assembly is provided for transferring mechanical rotating power from the engine to the variator in one or more modes of operation of the transmission. The input assembly may include one or more directional clutches (e.g., forward and reverse clutches). In various configurations, the transmission will provide multiple forward speeds and multiple reverse speeds. One or more speeds, or operational modes, may be effected solely from engine input power ("engine-only" power) or solely from electric machine input power ("series-electric" power). The single-source power may be routed through the transmission, without passing through the variator, for tractive or other use in the work vehicle in a number of discreet operational modes. Alternatively, in one or more modes, the engine and electric power sources may also provide combined or summed ("split-path") power. Varying the electric machine varies the power band of the split-path operational modes, the engine may be running at constant speed and power. Generally, the electric machine may be a lower capacity motor, and thereby less costly, smaller and occupying less space in the engine compartment, as compared to both electrified synchronous gear sets and conventional power shift gear sets, which may have a larger number of gear components and larger shift steps. Multiple electric machines may be utilized, such as a second electric motor tied to the engine (e.g., via the input assembly) used as a generator for powering the first electric machine.

In certain embodiments, the power shift assembly has a set of speed gears, each of the gears being mounted one of multiple parallel shafts. For example, the power shift assembly, and the transmission, may provide eight forward and eight reverse speed modes using two countershafts, each supporting three or four gears (e.g., an odd number of gears on one of the countershafts and an even number of gears on the other of the countershafts) and a number of power shift and speed clutches (e.g., a power shift clutch and four speed clutches on each countershaft). This arrangement enables step sizes between speed modes to be reduced as speed increases, thereby enabling fewer shifts at low speed and better control at higher speeds.

In certain embodiments, speed gears are mounted on multiple countershafts providing alternative power flow paths to the output. Various architectures are envisioned, including, two countershafts each with a single power shift clutch and, together with an output shaft, carrying eight speed gears proving eight forward and reverse speed modes. Other dual power flow path arrangements are contemplated, such as for six forward and six reverse speed modes as well as ten forward and ten reverse speed modes. In each, the transmission arrangement is configured with closely constrained steps, such as within 5 to 10 percent, between modes and to allow for a wide power band within each mode, permitting output speeds to double or near double from the low to high end of each mode.

In some embodiments, the transmission discussed herein may be considered a variable dual path transmission (vDPT), as opposed to an infinitely variable transmission (IVT) or a traditional power shift transmission (PST). In some respects, the variable dual path transmission (vDPT) may be considered a hybrid transmission that provides at least some of the benefits of the infinitely variable transmission (IVT) and a traditional power shift transmission (PST). In particular, the variable dual path transmission (vDPT) may have six, eight, nine, or more split-path modes, in each direction, as compared to three or four split-path modes for an infinitely variable transmission (IVT), and provides the variability that may not otherwise be available in a traditional power shift transmission (PST). The additional modes provided by the variable dual path transmission (vDPT) enables the use of relatively small electric machines than would otherwise be required for an infinitely variable transmission (IVT) with comparable capabilities.

Generally, the variable dual path transmission (vDPT) is enabled by a variator with a single-row simple planetary gear set that operates to combine rotational inputs from an engine and an electric motor in order to provide the combined rotational inputs to a power shift assembly. The power shift assembly includes a number of power shift clutches configured to dissipate energy from asynchronous shaft rotations and associated gear meshing.

In certain embodiments, the transmission provides a low-speed creeper mode, which in certain configurations may be a synchronous shift step from the aforementioned six, eight or ten speed modes. The creeper mode may also be a bi-direction in that it allows for a low speed creep in both forward and reverse directions without requiring a shift to change directions. The creeper mode may be effected by a creeper clutch selectively coupling an electric machine to the power shift assembly of the transmission, independently of an input assembly or a variator.

In further embodiments, however, the below-described transmission and variants thereof can be integrated into other types of work vehicle platforms, such as work vehicle vehicles employed within the agricultural, construction, forestry, and mining industries. Accordingly, the following description should be understood as merely establishing a non-limiting context in which embodiments of the present disclosure may be better understood.

Example Embodiments of an
Electronically-Variable, Dual-Path Power Shift
Transmission for Work Vehicle As will become apparent from the discussion herein, the disclosed power shift transmission and associated powertrain may be used advantageously in a variety of settings and with a variety of machinery. For example, referring now to FIG. 1, an example of the disclosed transmission may be included in a work vehicle 100. In FIG. 1, the work vehicle 100 is depicted as a tractor with a powertrain 102 (shown schematically). It will be understood, however, that other configurations may be possible, including configurations with the vehicle 100 as a different kind of tractor, a harvester, a log skidder, a grader, or one of various other work vehicle types. It will further be understood that the disclosed powertrains may also be used in non-work vehicles and non-vehicle applications (e.g., fixed-location power installations).

Generally, the powertrain 102 may be configured to generate power and to transmit the power from an engine 104 and/or other power sources (discussed below) to an output member (e.g., an output shaft) via a variable power shift transmission (also discussed below). In some embodiments, such an output member of the powertrain 102 may transmit the power to a rear axle 106 and/or to a front axle 108 of the work vehicle 100. However, the powertrain 102 may also be configured for delivering power to a power take-off shaft that drives an implement that is supported on the work vehicle 100 or that is supported on a separate vehicle. It will be appreciated that the powertrain 102 may be configured for delivering power to other power sinks without departing from the scope of the present disclosure.

Although not discussed in detail, a controller 110 may facilitate operation of the powertrain 102 and/or work vehicle 100, either automatically or based on operator commands. Such operator commands may be generated upon operator interaction with a human-machine interface and various controls therein configured to receive input commands from the operator to control, for example, various electric or hydraulic systems associated with controlling the aforementioned components. The human-machine interface may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices.

As an example, the controller 110 may facilitate operation of the transmission of the powertrain 102 into the various modes discussed in greater detail below, as well as other systems and components of the work vehicle 100 and any of the functions described herein. The controller 110 may be configured as computing devices with associated processor devices and memory architectures, as hydraulic, electrical or electro-hydraulic controllers, or otherwise. In one example, the controller 110 may be implemented with processing architecture such as a processor and memory, as well as suitable communication interfaces. For example, the controller 110 may implement functional modules or units with the processor based on programs or instructions stored in memory.

Figure 2:
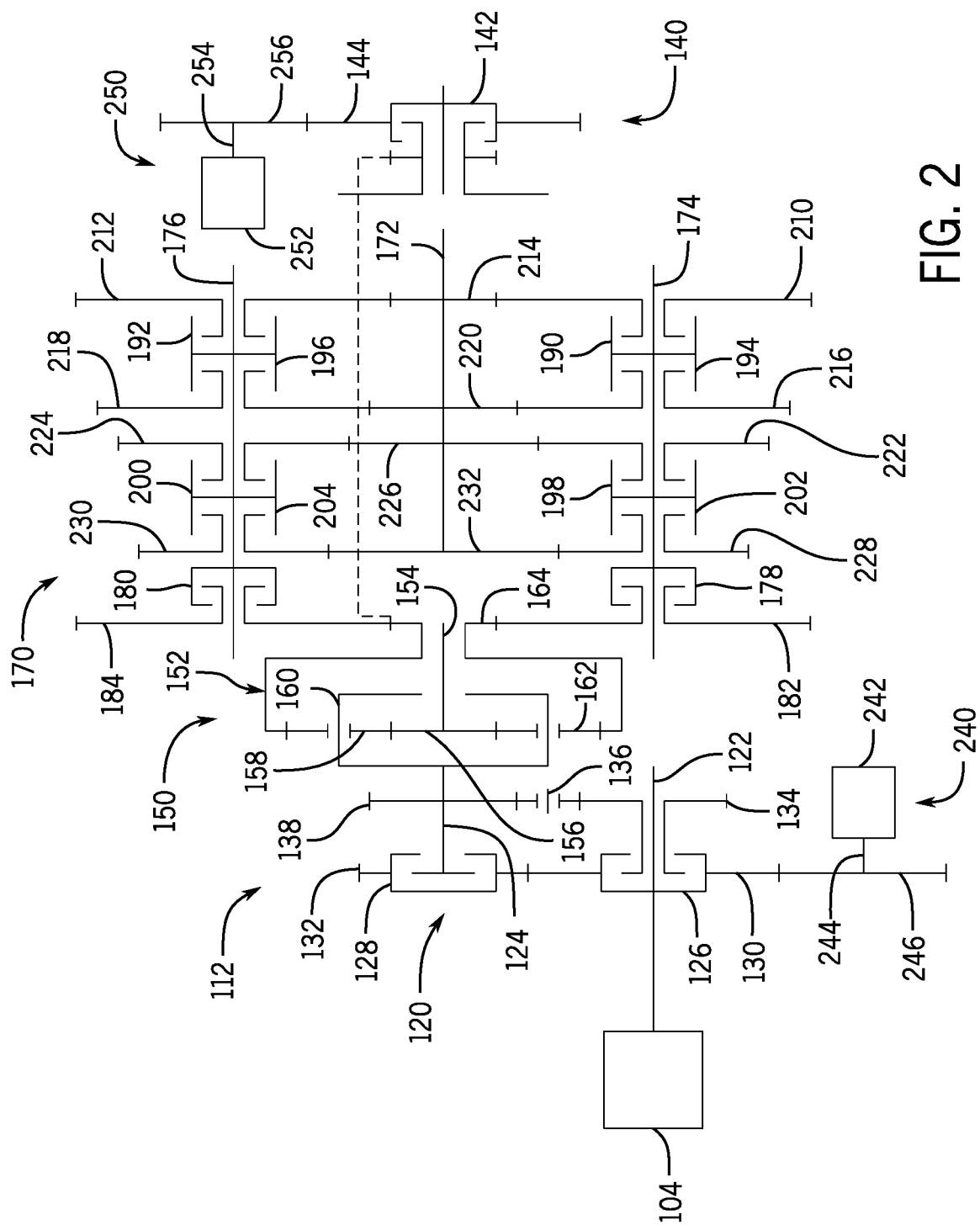
FIG. 2 is a schematic view of a multi-mode continuously variable power shift transmission of the work vehicle of FIG. 1 according to an example embodiment of the present disclosure.

Referring now to FIG. 2, an example configuration of the powertrain 102 is depicted schematically. The powertrain 102 may include the engine 104, which may be an internal combustion engine of various known configurations, and one or more continuously variable power (CVP) assemblies 240, 250. The powertrain 102 also includes a variable power shift transmission 112 that operates to transfer power between the engine 104, the CVP assemblies 240, 250, and one or more output shafts (e.g., output shaft 172). Each CVP assembly 240, 250 may include at least one continuously variable machine (CVM), such as an electrical machine or a hydraulic machine (e.g., CVMs 242, 252, discussed below).

Generally, the transmission 112 includes a plurality of components, such as shafts, gears, gear sets, clutches, brakes, and/or other components, that interconnect to enable the transfer power amongst the engine 104, the first CVM 242, and/or the second CVM 252 to appropriately power the output shaft 172 and/or one or more other output members. The transmission 112 may be considered a continuously variable transmission or an infinitely variable transmission. Also, the transmission 112 may be configured to provide selection between one of numerous transmission modes, as discussed in greater detail below. In one or more modes, the transmission 112 may be driven solely from solely from electric machine input power ("series-electric" power). The single-source power may be routed through the transmission, without passing through the variator, for tractive or other use in the work vehicle in a number of discreet operational modes. Moreover, the transmission 112 may be operated in modes in which the engine and electric power sources are combined or summed ("split-path") power. Varying the electric machine varies the power band of the split-path operational modes, the engine may be running at constant speed and power. Although not discussed in detail below, the transmission 112 may also be driven solely from engine input power ("engine-only" power).

In one example, the output shaft 172 may form or may be directly connected to one or more power sinks (e.g., one or both axles 106, 108) of the work vehicle 100. An additional power output of the transmission 112 may be one or power take-off ("PTO") shaft elements (not shown).

Generally, in some embodiments, the transmission may be considered to include an engine input assembly 120, a CVP input assembly 140, a variator 150, and a power shift assembly 170. Although FIG. 2 depicts one example of a suitable transmission 112, the present disclosure is also applicable to other transmission arrangements and configurations.

In one example, the input assembly 120 is generally arranged to distribute power from the engine 104 to the first CVP assembly 240 and/or the variator 150. Although described as an "input" assembly 120 in which power from the engine 104 drives other aspects of the transmission 112, in some examples, the input assembly 120 may provide power to the engine 104. In any event, the input assembly 120 includes an input countershaft 122 and an input main shaft 124 that support a number of clutches 126, 128 and gears (or gear elements) 130, 132, 134, 136, 138. The clutches 126, 128 may be considered directional clutches in that the forward clutch 128 operates to drive the input main shaft 124 for the variator 150 in a forward (or first) direction, and the reverse clutch 126 operates to drive the input main shaft 124 for the variator 150 in a reverse (or second direction). Moreover, in the discussion below, the gears 130, 132, 134, 136, 138 may be referenced as the first gear 130, second gear 132, third gear 134, fourth gear 136, and fifth gear 138.

The reverse clutch 126 has a first portion (e.g., a first clutch plate) that is fixedly coupled to an input stub shaft (or shaft element) that circumscribes the input countershaft 122 and supports the third gear 134 and a second portion (e.g., a second clutch plate) that is fixedly coupled to an input element of the engine 104 and supports the first gear 130. The third gear 134, fixedly coupled the first element of the reverse clutch 126, is rotationally coupled to the input main shaft 124 via the fifth gear 138 and the fourth (or idler) gear 136 enmeshed in between the third gear 134 and the fifth gear 138. As a result of this arrangement, upon engagement, the reverse clutch 126 may drive the input main shaft 124 in the reverse direction with power flowing from the engine 104, across the reverse clutch 126, and through gears 134, 136, 138 to the input main shaft 124. Upon disengagement of the reverse clutch 126, the input countershaft 122 is rotationally decoupled from the input main shaft 124 via gears 134, 136, 138.

As shown, the forward clutch 128 may be considered to include a first portion (e.g., a first clutch plate) fixedly coupled to the input main shaft 124 and a second portion (e.g., a second clutch plate) supporting the second gear 132 that may be engaged to receive engine power via gear 130 such that the first and second portions of the forward clutch 128 may be selectively engaged to rotationally couple the engine 104 to the input main shaft 124 or selectively disengaged to rotationally decouple the engine 104 from the main shaft 124 via gears 130, 132.

Additionally, in this arrangement, the engine 104 may provide power to the first CVP assembly 240 through the input assembly 120. In particular, the second element of the reverse clutch 126 transfers power (via the first gear 130) to the first CVP assembly 240. Additional details about the first CVP assembly 240 are provided below.

Further in this arrangement, the second CVP assembly 250 may provide power to the power shaft assembly 170 via a CVP input assembly 140, independently of the variator 150 or engine input assembly 120. In particular, the CVP input assembly 140 may include a creeper clutch 142 with a first element (e.g., a first clutch plate) circumscribing a variator shaft 154 (discussed below) and supporting a sixth gear 164 and a second element (e.g., a second clutch plate) fixedly coupled to the variator shaft 154 and supporting a seventh gear 144. As described in greater detail below, the sixth gear 164 functions as an input element to the power shift assembly 170. As such, upon engagement of the creeper clutch 142, the second CVP assembly 250 may drive the power shift assembly 170 via gears 144, 164; and upon disengagement of the creeper clutch 142, the CVP assembly 250 may provide rotational input to the variator 150 via gear 144 and the variator shaft 154, as discussed in greater detail below. Furthermore, additional details about the second CVP assembly 250 are also provided below.

As introduced above, the transmission 112 further includes the variator 150 to condition the power from the engine 104 and the second CVP assembly 250. As noted above, the variator 150 is operably connected to the engine 104 via the input assembly 120. Generally, the variator 150 may include a variety of devices capable of summing the mechanical inputs from the engine 104 and the second CVP assembly 250 for combined mechanical outputs to the power shift assembly 170.

In one example, the variator 150 includes a planetary gear set 152 and a variator shaft 154 about which the planetary gear set 152 is centered. In this example, the planetary gear set 152 is a single row planet set with a sun gear 156, a series of planet gears 158 supported on a carrier 160, and a ring gear 162. The sun gear 156 is fixedly coupled to the variator shaft 154, and the planet gears 158 may be enmeshed with and disposed between the sun gear 156 and the ring gear 162. As shown, the carrier 160 may function as an input member to transfer power from the input assembly 120 to the variator 150 via the input main shaft 124 in either direction; and the sun gear 156 may function as an input member to transfer power from the second CVP assembly 250 to the variator 150 via the variator shaft 154 and the seventh gear 144 supported on the variator shaft 154 and engaged with the second CVP assembly 250 in either direction. Moreover, the ring gear 162 may function as an output member of the variator 150 to transfer power to the power shift assembly 170 via the sixth gear 164 rotationally coupled to the ring gear 162.

In the disclosed examples, the variator 150 includes a single planetary gear set 152 (e.g., a single-row simple planetary gear set with a single sun gear 156, a single set or row of planet gears 158, a single carrier 160, and a single ring gear 162. This is in contrast to compound or multiple planetary gear sets 152 (e.g., with multiple meshed-planet gears in a planet train, stepped planet gears within a planet train, and/or multi-stage structures). The variator 150 with the single planetary gear set 152 provides a mechanism for combining multiple power flows as opposed to planetary gear set arrangements that may be primarily directed to speed reductions.

In one example, the power shift assembly 170 includes a power shift output (or main) shaft 172, a first power shift countershaft 174, and a second power shift countershaft 176. As discussed in greater detail below, the power shift assembly 170 is coupled to receive power from and rotate with the ring gear 162 of the variator 150 via gear 164 and to provide power to the output shaft 172, either directly or through the power shift countershafts 174, 176. The power shift assembly 170 further includes one or more power shift clutches 178, 180, number of speed clutches 190, 192, 194, 196, 198, 200, 202, 204 and gears 182, 184, 210, 212, 214, 216, 218, 220, 222, 224, 226, 228, 230, 232 to selectively transfer power between the shafts 172, 174, 176.

In the depicted arrangement, the first power shift clutch 178 and four speed clutches 190, 194, 198, 202 are supported on the first countershaft 174, and the second power shift clutch 190 and four speed clutches 192, 196, 200, 204 are supported on the second countershaft 176, although other examples may have other arrangements. As noted above, the sixth gear 164 provides input power flows to the power shift arrangement 170, either from the variator 150 via the ring gear 162 or more directly from the CVP assembly 250 via the CVP input assembly 140. As described below, the power shift clutches 178, 180 may be selectively engaged to transfer power through one of the countershafts 174, 176 to the output shaft 172 via one of the speed clutches 190, 192, 194, 196, 198, 200, 202, 204.

In one example, the first power shift clutch 178 has a first portion (e.g., a first clutch plate) coupled to a stub shaft or shaft element circumscribing the first countershaft 174 and supporting an eighth gear 182 and a second portion (e.g., a second clutch plate) that is fixedly coupled to the first countershaft 174. The eighth gear 182 is engaged with the gear 164 functioning as the input element of the power shift assembly 170. As such, upon engagement of the first power shift clutch 178, the first countershaft 174 is configured to receive input power via gears 164, 182; and upon disengagement of the first power shift clutch 178, the first countershaft 174 is rotationally decoupled relative from input power flows at the gear 164.

In one example, the second power shift clutch 180 has a first portion (e.g., a first clutch plate) coupled to a stub shaft or shaft element circumscribing the second countershaft 176 and supporting a ninth gear 184 and a second portion (e.g., a second clutch plate) that is fixedly coupled to the second countershaft 176. The ninth gear 184 is engaged with the gear 164 functioning as the input element of the power shift assembly 170. As such, upon engagement of the second power shift clutch 180, the second countershaft 176 is configured to receive input power via gears 164, 184; and upon disengagement of the second power shift clutch 180, the second countershaft 176 is rotationally decoupled relative from input power flows at the gear 164.

The first speed clutch 190 has a first portion (e.g., a first clutch plate) coupled to a stub shaft (or shaft element) circumscribing the first countershaft 174 and supporting a tenth gear 210 and a second portion (e.g., a second clutch plate) that is fixedly coupled to the first countershaft 174. The second speed clutch 192 has a first portion (e.g., a first clutch plate) coupled to a stub shaft (or shaft element) circumscribing the second countershaft 176 and supporting an eleventh gear 212 and a second portion (e.g., a second clutch plate) that is fixedly coupled to the second countershaft 176. Each of the tenth and eleventh gears 210, 212 is engaged with a twelfth gear 214 that is fixedly mounted on the output shaft 172. As such, upon engagement of the first speed clutch 190, the first power shift countershaft 174 is rotationally coupled to the output shaft 172 through the gears 210, 214; and upon engagement of the second speed clutch 192, the second power shift countershaft 176 is rotationally coupled to the output shaft 172 through the gears 212, 214. Further, disengagement of the first speed clutch 190 decouples the power flow between shafts 172, 174 at gears 210, 214; and disengagement of the second speed clutch 192 decouples the power flow between shafts 172, 176 at gears 212, 214.

The third speed clutch 194 has a first portion (e.g., a first clutch plate) coupled to a stub shaft (or shaft element) circumscribing the first countershaft 174 and supporting a thirteenth gear 216 and a second portion (e.g., a second clutch plate) that is fixedly coupled to the first countershaft 174. The fourth speed clutch 196 has a first portion (e.g., a first clutch plate) coupled to a stub shaft (or shaft element) circumscribing the second countershaft 176 and supporting a fourteenth gear 218 and a second portion (e.g., a second clutch plate) that is fixedly coupled to the second countershaft 176. Each of the thirteenth and fourteenth gears 216, 218 is engaged with a fifteenth gear 220 that is fixedly mounted on the output shaft 172. As such, upon engagement of the third speed clutch 194, the first power shift countershaft 174 is rotationally coupled to the output shaft 172 through the gears 216, 220; and upon engagement of the fourth speed clutch 196, the second power shift countershaft 176 is rotationally coupled to the output shaft 172 through the gears 218, 220. Further, disengagement of the third speed clutch 194 decouples the power flow between shafts 172, 174 at gears 216, 220; and disengagement of the fourth speed clutch 196 decouples the power flow between shafts 172, 176 at gears 218, 220.

The fifth speed clutch 198 has a first portion (e.g., a first clutch plate) coupled to a stub shaft (or shaft element) circumscribing the first countershaft 174 and supporting a sixteenth gear 222 and a second portion (e.g., a second clutch plate) that is fixedly coupled to the first countershaft 174. The sixth speed clutch 200 has a first portion (e.g., a first clutch plate) coupled to a stub shaft (or shaft element) circumscribing the second countershaft 176 and supporting a seventeenth gear 224 and a second portion (e.g., a second clutch plate) that is fixedly coupled to the second countershaft 176. Each of the sixteenth and seventeenth gears 222, 224 is engaged with an eighteenth gear 226 that is fixedly mounted on the output shaft 172. As such, upon engagement of the fifth speed clutch 198, the first power shift countershaft 174 is rotationally coupled to the output shaft 172 through the gears 222, 226; and upon engagement of the sixth speed clutch 200, the second power shift countershaft 176 is rotationally coupled to the output shaft 172 through the gears 224, 226. Further, disengagement of the fifth speed clutch 198 decouples the power flow between shafts 172, 174 at gears 222, 226; and disengagement of the sixth speed clutch 200 decouples the power flow between shafts 172, 176 at gears 224, 226.

The seventh speed clutch 202 has a first portion (e.g., a first clutch plate) coupled to a stub shaft (or shaft element) circumscribing the first countershaft 174 and supporting a nineteenth gear 228 and a second portion (e.g., a second clutch plate) that is fixedly coupled to the first countershaft 174. The eighth speed clutch 204 has a first portion (e.g., a first clutch plate) coupled to a stub shaft (or shaft element) circumscribing the second countershaft 176 and supporting a twentieth gear 230 and a second portion (e.g., a second clutch plate) that is fixedly coupled to the second countershaft 176. Each of the nineteenth and twentieth gears 228, 230 is engaged with a twenty-first gear 232 that is fixedly mounted on the output shaft 172. As such, upon engagement of the seventh speed clutch 202, the first power shift countershaft 174 is rotationally coupled to the output shaft 172 through the gears 228, 232; and upon engagement of the eighth speed clutch 204, the second power shift countershaft 176 is rotationally coupled to the output shaft 172 through the gears 230, 232. Further, disengagement of the seventh speed clutch 202 decouples the power flow between shafts 172, 174 at gears 228, 232; and disengagement of the eighth speed clutch 204 decouples the power flow between shafts 172, 176 at gears 230, 232.

As introduced above, the first and second CVP assemblies 240, 250 are arranged to provide power to, or receive power from, other portions of the transmission 112. In one example, the first CVP assembly 240 is configured to receive power from the input assembly 120, and the second CVP assembly 250 is configured to provide power to the variator 150 to supplement engine power and/or to the power shift assembly 170 to or replace engine power. As shown, the first CVP assembly 240 includes a first CVM 242, a CVP shaft 244 extending form the first CVM 242, and a first CVP gear 246 mounted on the first CVP shaft 244; and the second CVP assembly 250 includes a second CVM 252, a second CVP shaft 254 extending form the second CVM 252, and a second CVP gear 256 mounted on the second CVP shaft 254. Generally, the first and second CVMs 242, 252 may be configured to convert power, e.g., from mechanical to electrical or hydraulic or vice versa. Various known control devices (not shown) may be provided to regulate such conversion, transmission, re-conversion and so on. As examples, the first and second CVMs 242, 252 may be electrical machines configured to operate as a motor (to output mechanical power from electrical input power) and as a generator (to output electrical power from mechanical input power). In one example configuration, the first CVM 242 is configured to function as a generator to generate electrical power from the mechanical inputs of the input assembly 120; and the second CVM 252 is configured to function as a motor to provide generate mechanical power to the variator 150 and/or the power shift assembly 170 from electrical inputs (e.g., from batteries or the first CVM 242). In the particular configuration depicted in FIG. 2, the first CVP gear 246 is engaged with the first gear 130 mounted on the input countershaft 122 as a portion of the reverse clutch 126, thereby enabling the input assembly 120 to be rotationally coupled to first CVP assembly 240. Further in FIG. 2, the second CVP gear 256 is engaged with the seventh gear 144 mounted on the variator shaft 154, thereby enabling the second CVP assembly 250 to be rotationally coupled to the variator 150; and the second CVP gear 256 may be selectively engaged with the seventh gear 144 through the creeper clutch 142, thereby enabling the second CVP assembly 250 to be rotationally coupled to the power shift assembly 170. In some arrangements, the first CVM 242 and second CVM 252 may be electrically coupled together to support and/or interact with one another. For example, the second CVM 252 may be powered by electrical power from the first CVM 242, or vice versa.

As noted above, the transmission 112 may be commanded to operate in various modes to provide suitable output power, conditioned at suitable torques and speeds at the output shaft 172. As described below, the transmission 112 may operate with one or more creeper modes in which only the second CVM 252 powers the transmission 112 (e.g., series modes) and eight forward modes and eight reverse modes in which the power from the engine 104 and second CVM 252 are combined (e.g., split power modes).

Figure 3:
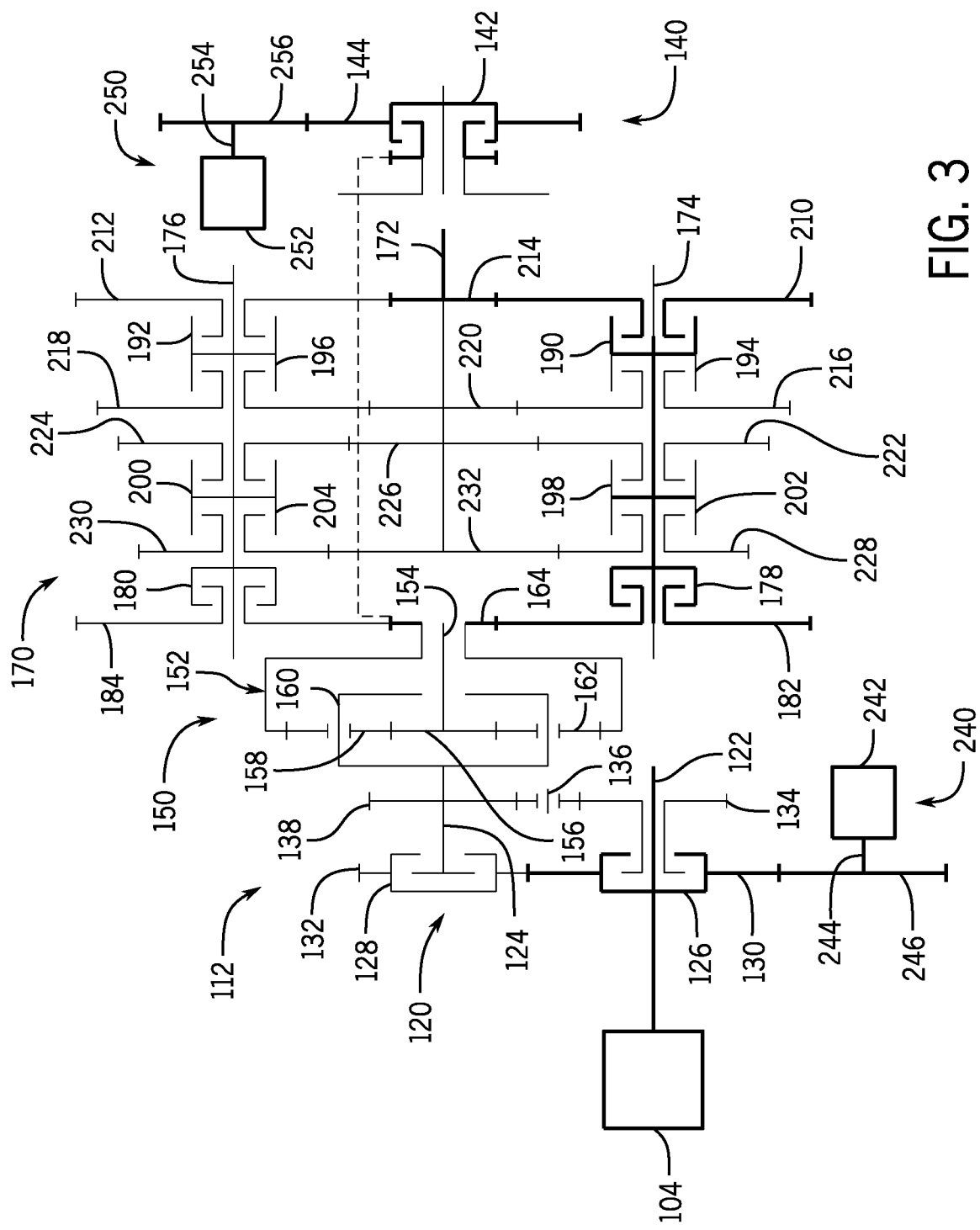
FIG. 3 are schematic views of the multi-mode continuously variable power shift transmission of FIG. 2 depicting the power flows in a creeper mode according to example embodiments of the present disclosure.

The creeper mode will now be discussed with reference to FIG. 3, which is a schematic view of the transmission 112 of FIG. 2 with the power flow of the creeper mode highlighted. In the creeper mode, the creeper clutch 142, the first power shift clutch 178, and the first speed clutch 190 are engaged, and the remaining clutches 126, 180, 192, 194, 196, 198, 200, 202, 204 are disengaged. As shown, the second CVP assembly 250 provides power through the creeper clutch 142 to the power shift assembly 170 through the gears 256, 144, 164. The power in the power shift assembly 170 is directed through the power shift clutch 180, across the first power shift countershaft 174, and to the output shaft 172 via gears 182, 210, 214. Generally, the creeper mode may also be bi-directional in that it allows for a low speed creep in both forward and reverse directions without requiring a shift to change directions. As shown, power from the engine 104 may flow through the second element of the reverse clutch 126 via gear 130 to the first CVP assembly 240 via gear 246, which operates to drive the CVM 242, thereby enabling generation of electrical power.

Figures 4A, 4B:
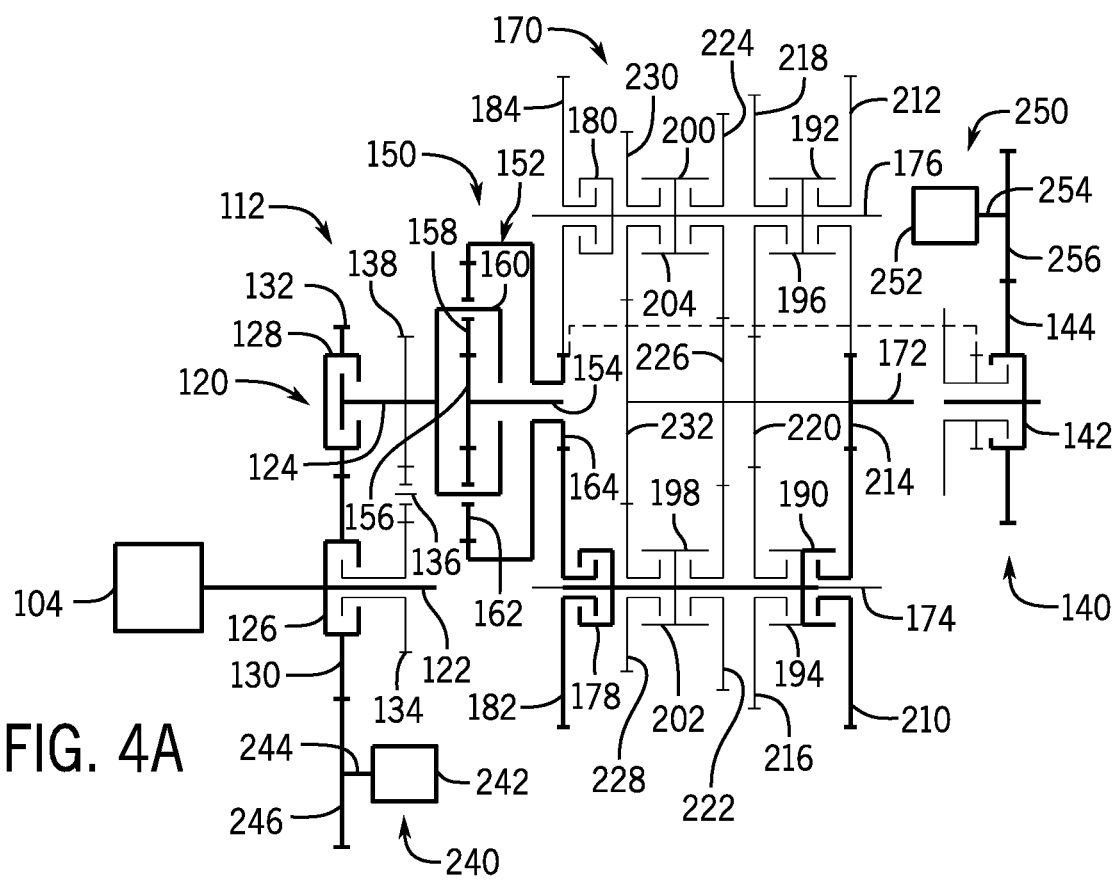

The first forward mode will now be discussed with reference to FIG. 4A, which is a schematic view of the transmission 112 of FIG. 2 with the power flow of the first forward mode highlighted. In the first forward mode, the forward clutch 128, the first power shift clutch 178, and the first speed clutch 190 are engaged, and the remaining clutches 126, 180, 192, 194, 196, 198, 200, 202, 204 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the first power shift clutch 178 via gears 164, 182, to the first power shift countershaft 174, and across the first speed clutch 190 to the output shaft 172 via gears 210, 214.

The second forward mode will now be discussed with reference to FIG. 4B, which is a schematic view of the transmission 112 of FIG. 2 with the power flow of the second forward mode highlighted. In the second forward mode, the forward clutch 128, the second power shift clutch 180, and the second speed clutch 192 are engaged, and the remaining clutches 126, 178, 190, 194, 196, 198, 200, 202, 204 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the second power shift clutch 180 via gears 164, 184, to the second power shift countershaft 176, and across the second speed clutch 192 to the output shaft 172 via gears 212, 214.

Figure 4C:
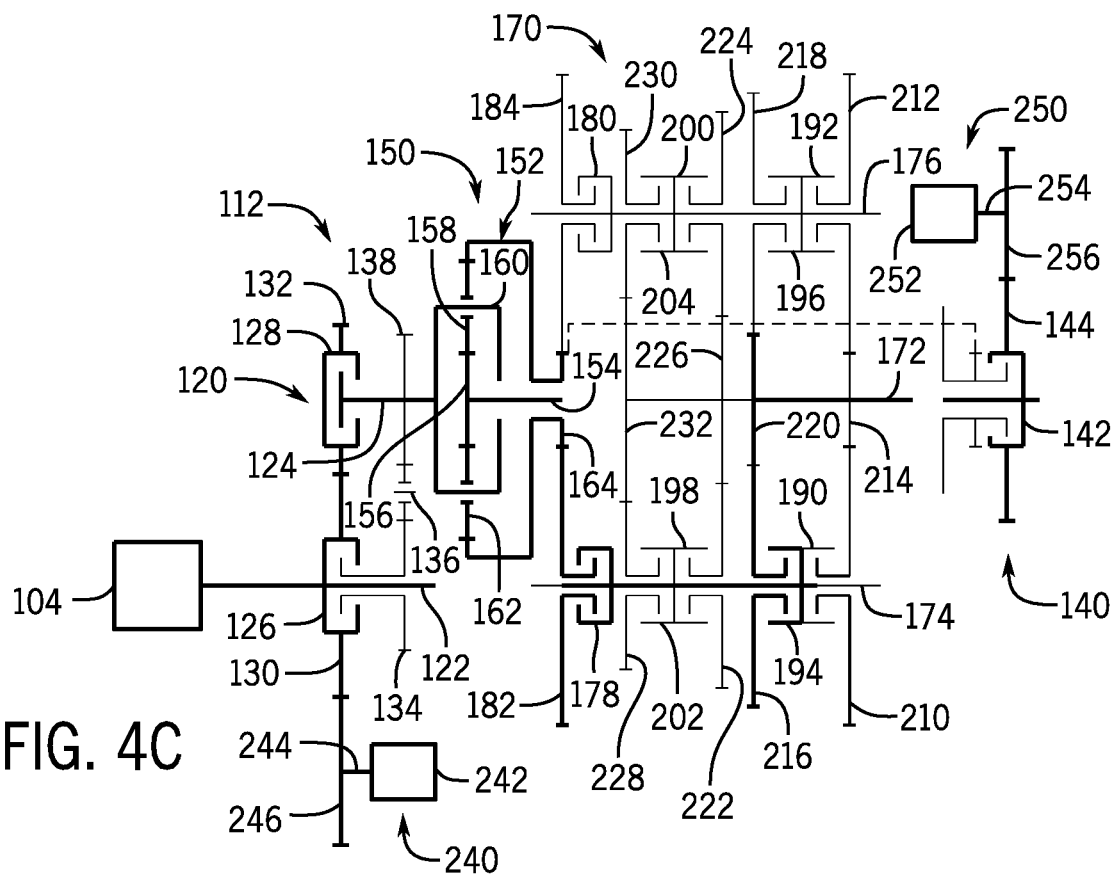

The third forward mode will now be discussed with reference to FIG. 4C, which is a schematic view of the transmission 112 of FIG. 2 with the power flow of the third forward mode highlighted. In the third forward mode, the forward clutch 128, the first power shift clutch 178, and the third speed clutch 194 are engaged, and the remaining clutches 126, 180, 190, 192, 196, 198, 200, 202, 204 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the first power shift clutch 178 via gears 164, 182, to the first power shift countershaft 174, and across the third speed clutch 194 to the output shaft 172 via gears 216, 220.

Figure 4D:
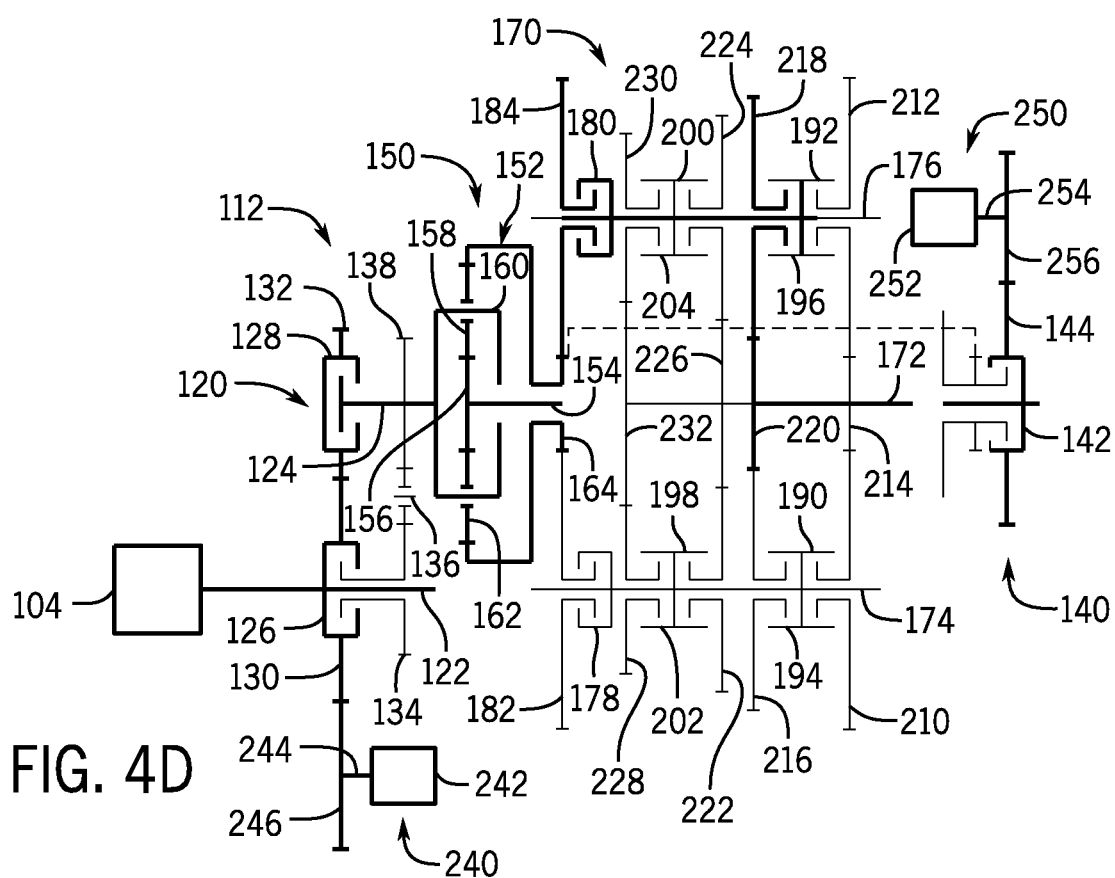

The fourth forward mode will now be discussed with reference to FIG. 4D, which is a schematic view of the transmission 112 of FIG. 2 with the power flow of the fourth forward mode highlighted. In the fourth forward mode, the forward clutch 128, the second power shift clutch 180, and the fourth speed clutch 196 are engaged, and the remaining clutches 126, 178, 190, 192, 194, 198, 200, 202, 204 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the second power shift clutch 180 via gears 164, 184, to the second power shift countershaft 176, and across the fourth speed clutch 196 to the output shaft 172 via gears 220, 218.

The fifth forward mode will now be discussed with reference to FIG. 4E, which is a schematic view of the transmission 112 of FIG. 2 with the power flow of the fifth forward mode highlighted. In the fifth forward mode, the forward clutch 128, the first power shift clutch 178, and the fifth speed clutch 198 are engaged, and the remaining clutches 126, 180, 190, 192, 194, 196, 200, 202, 204 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the first power shift clutch 178 via gears 164, 182, to the first power shift countershaft 174, and across the fifth speed clutch 198 to the output shaft 172 via gears 222, 226.

The sixth forward mode will now be discussed with reference to FIG. 4F, which is a schematic view of the transmission 112 of FIG. 2 with the power flow of the sixth forward mode highlighted. In the sixth forward mode, the forward clutch 128, the second power shift clutch 180, and the sixth speed clutch 200 are engaged, and the remaining clutches 126, 178, 190, 192, 194, 196, 198, 202, 204 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the second power shift clutch 180 via gears 164, 184, to the second power shift countershaft 176, and across the sixth speed clutch 200 to the output shaft 172 via gears 224, 226.

Figure 4G:
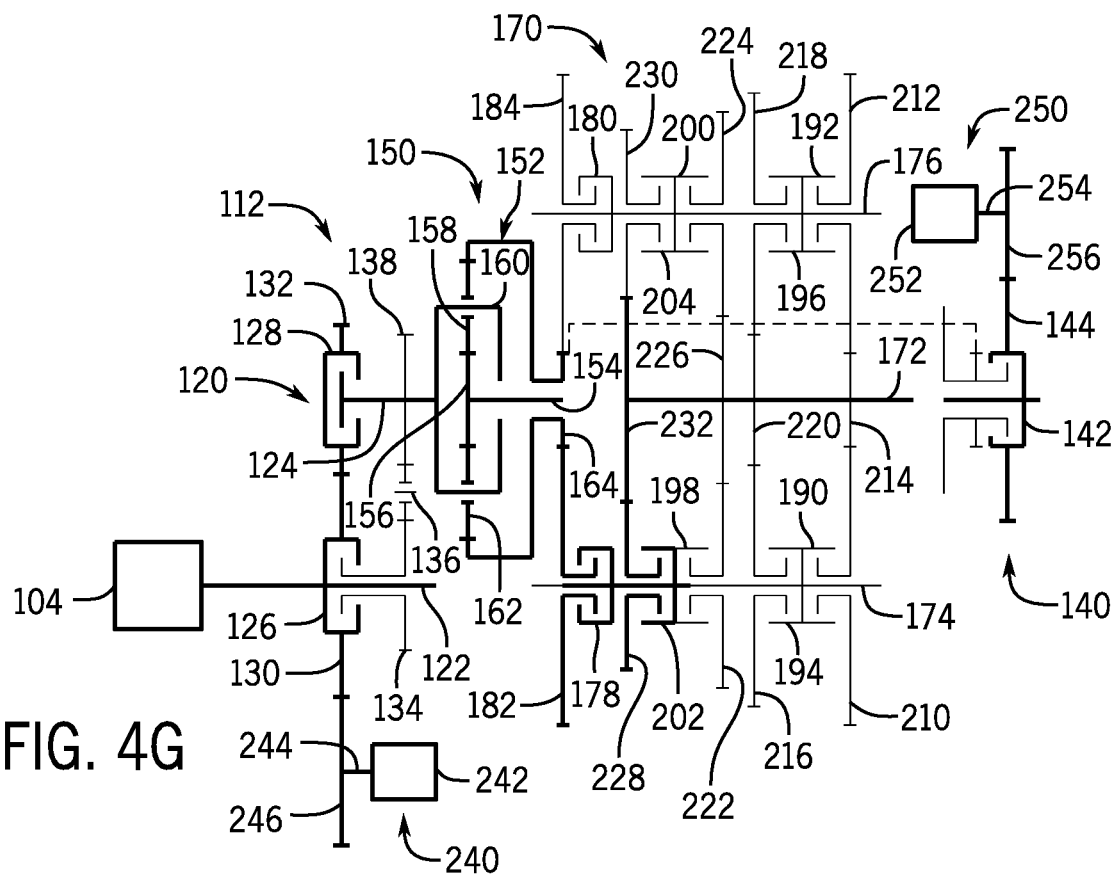

The seventh forward mode will now be discussed with reference to FIG. 4G, which is a schematic view of the transmission 112 of FIG. 2 with the power flow of the seventh forward mode highlighted. In the seventh forward mode, the forward clutch 128, the first power shift clutch 178, and the seventh speed clutch 202 are engaged, and the remaining clutches 126, 180, 190, 192, 194, 196, 198, 200, 204 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the first power shift clutch 178 via gears 164, 182, to the first power shift countershaft 174, and across the seventh speed clutch 202 to the output shaft 172 via gears 228, 232.

Figure 4H:
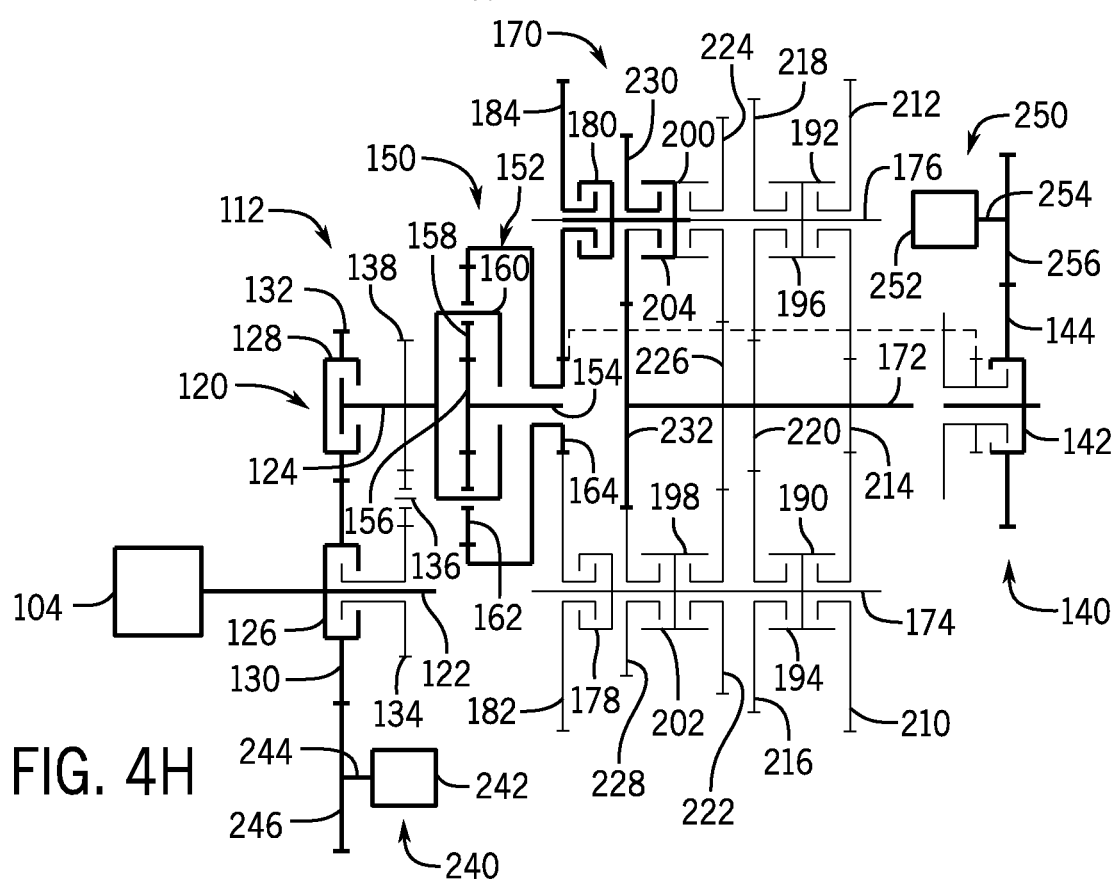

The eighth forward mode will now be discussed with reference to FIG. 4H, which is a schematic view of the transmission 112 of FIG. 2 with the power flow of the eighth forward mode highlighted. In the eighth forward mode, the forward clutch 128, the second power shift clutch 180, and the eighth speed clutch 204 are engaged, and the remaining clutches 126, 178, 190, 192, 194, 196, 198, 200, 202 are disengaged. As shown, the input assembly 120 receives the power from the engine 104, which flows through the forward clutch 128 to the variator 150 at the carrier 160 of the planetary gear set 152 via gears 130, 132. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the second power shift clutch 180 via gears 164, 184, to the second power shift countershaft 176, and across the eighth speed clutch 204 to the output shaft 172 via gears 230, 232.

Figure 5A:
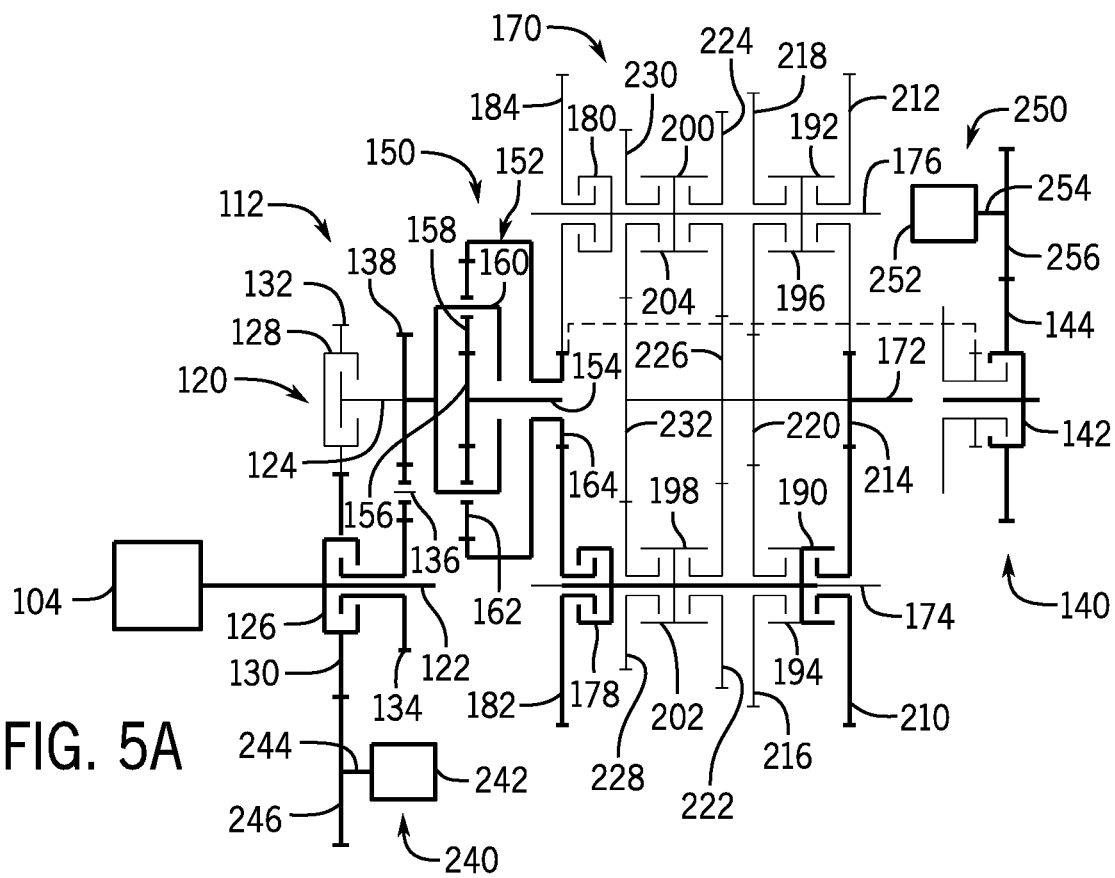
FIGS. 5A-5H are schematic views of the multi-mode continuously variable power shift transmission of FIG. 2 depicting the power flows in various reverse modes according to example embodiments of the present disclosure.
Figure 5B:
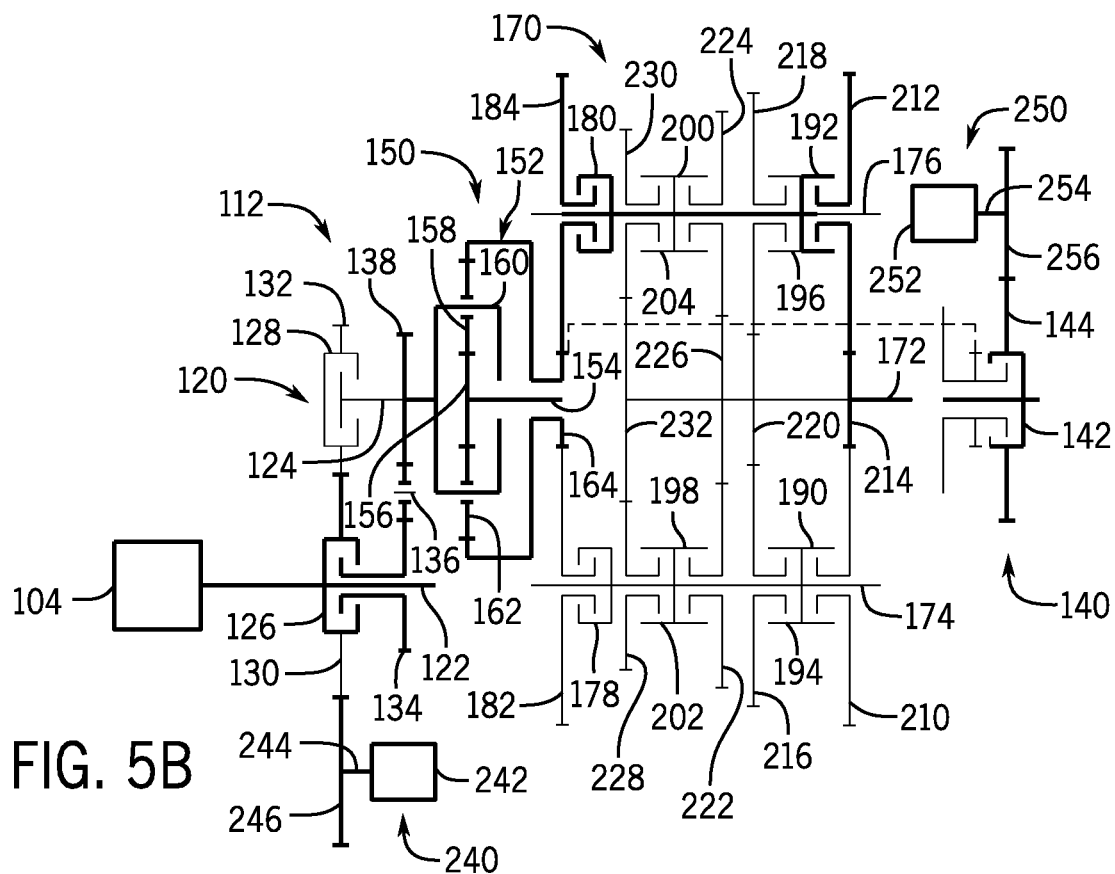
Figure 5C:
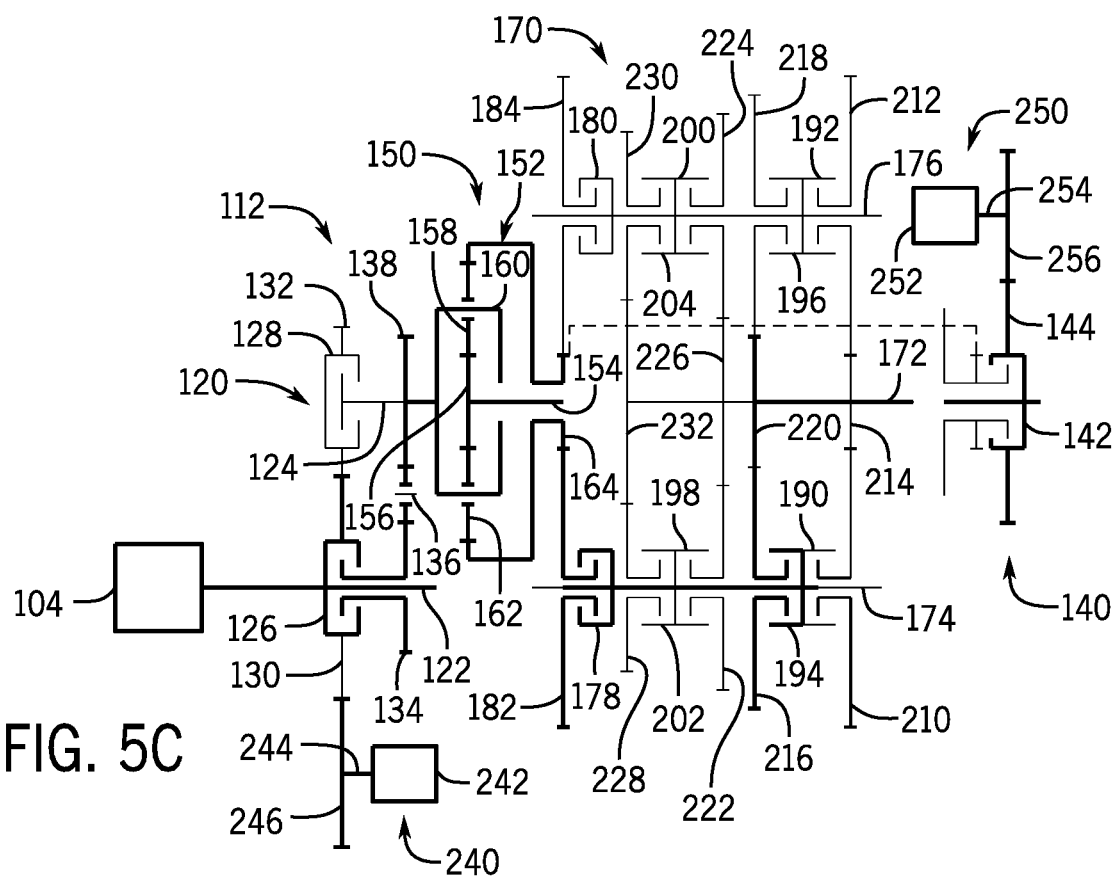
Figure 5D:
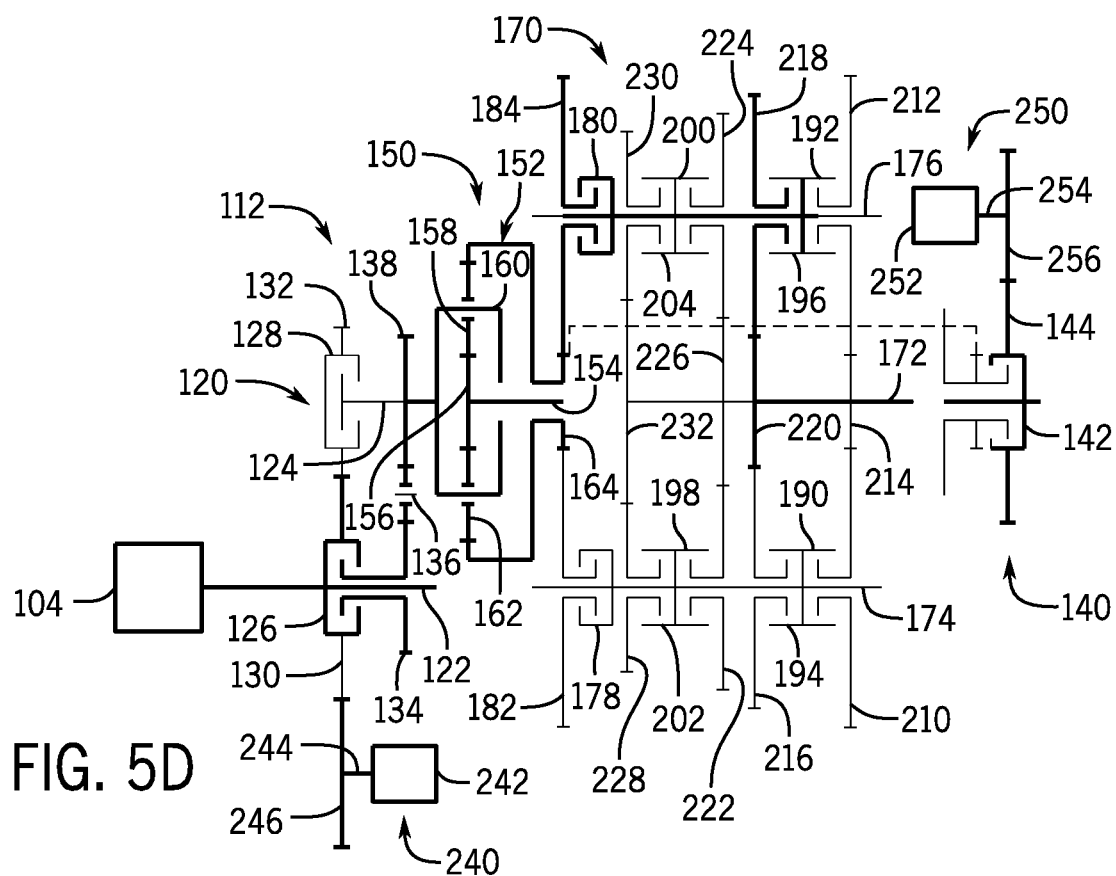
Figure 5E:
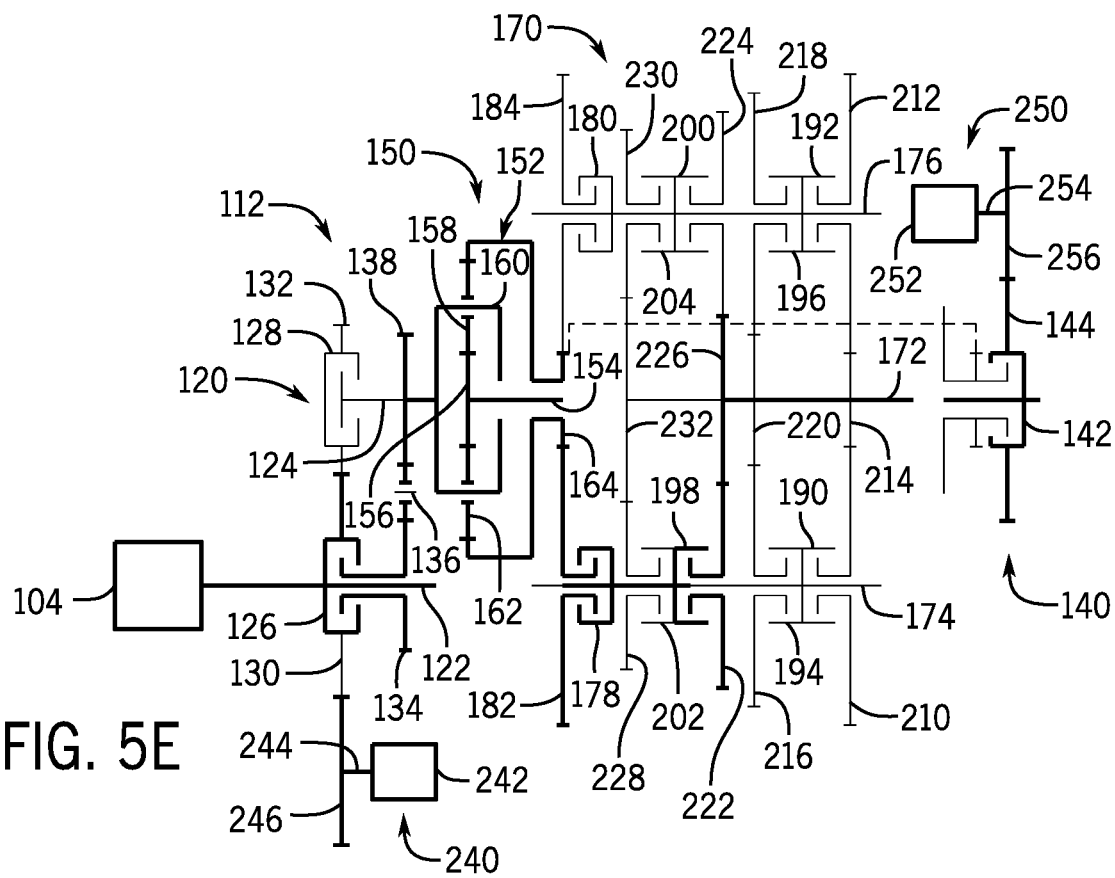
Figure 5F:
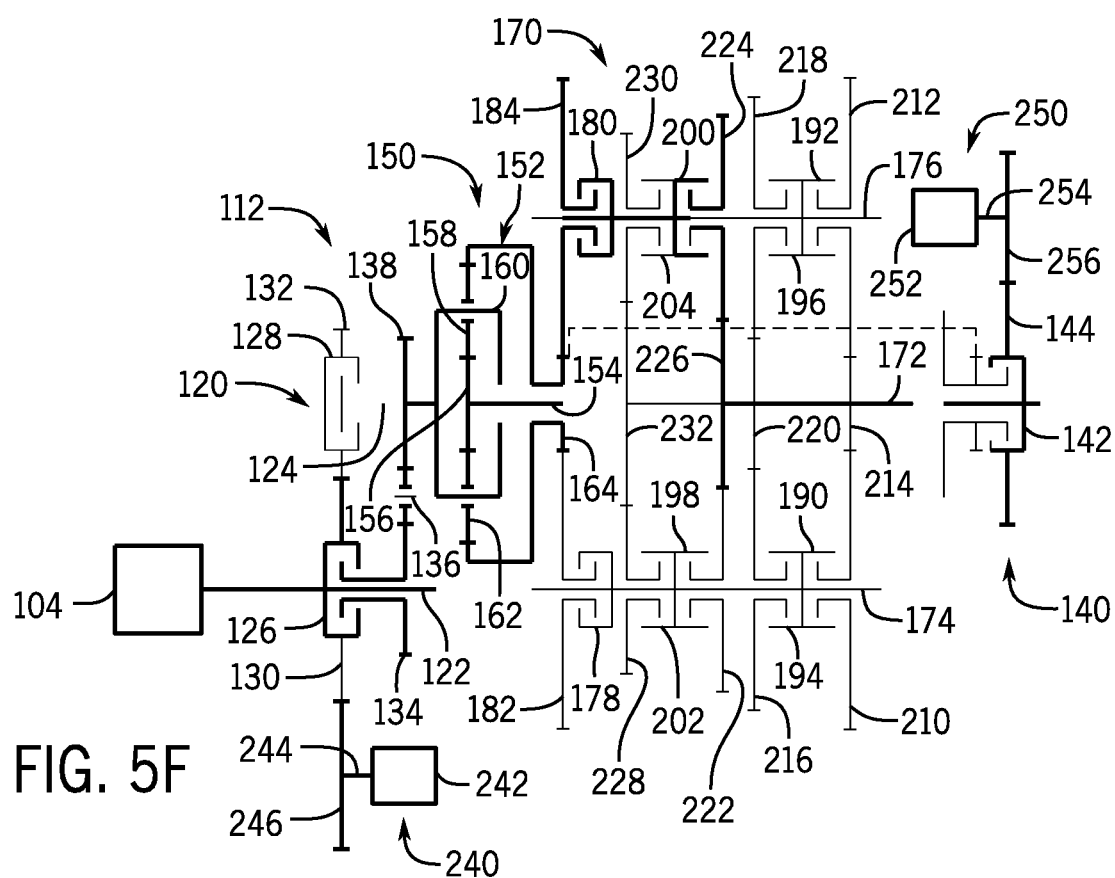
Figure 5G:
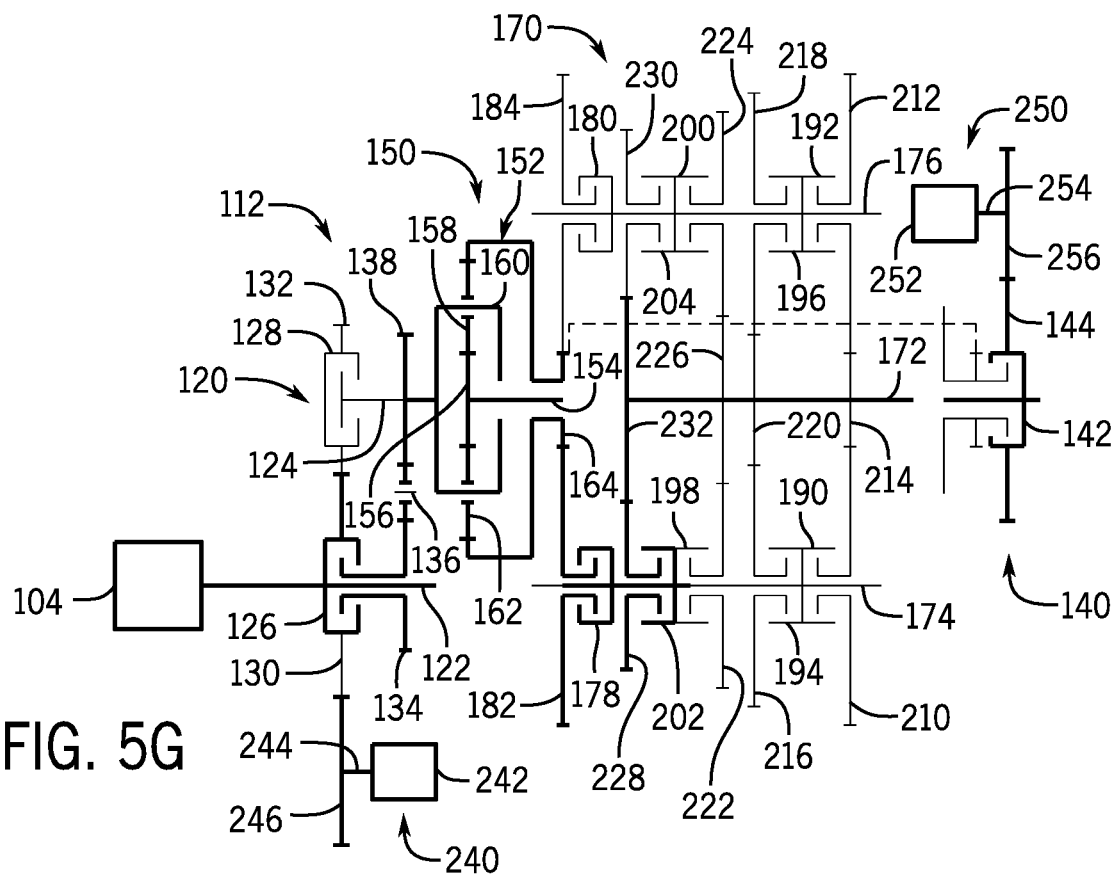
Figure 5H:
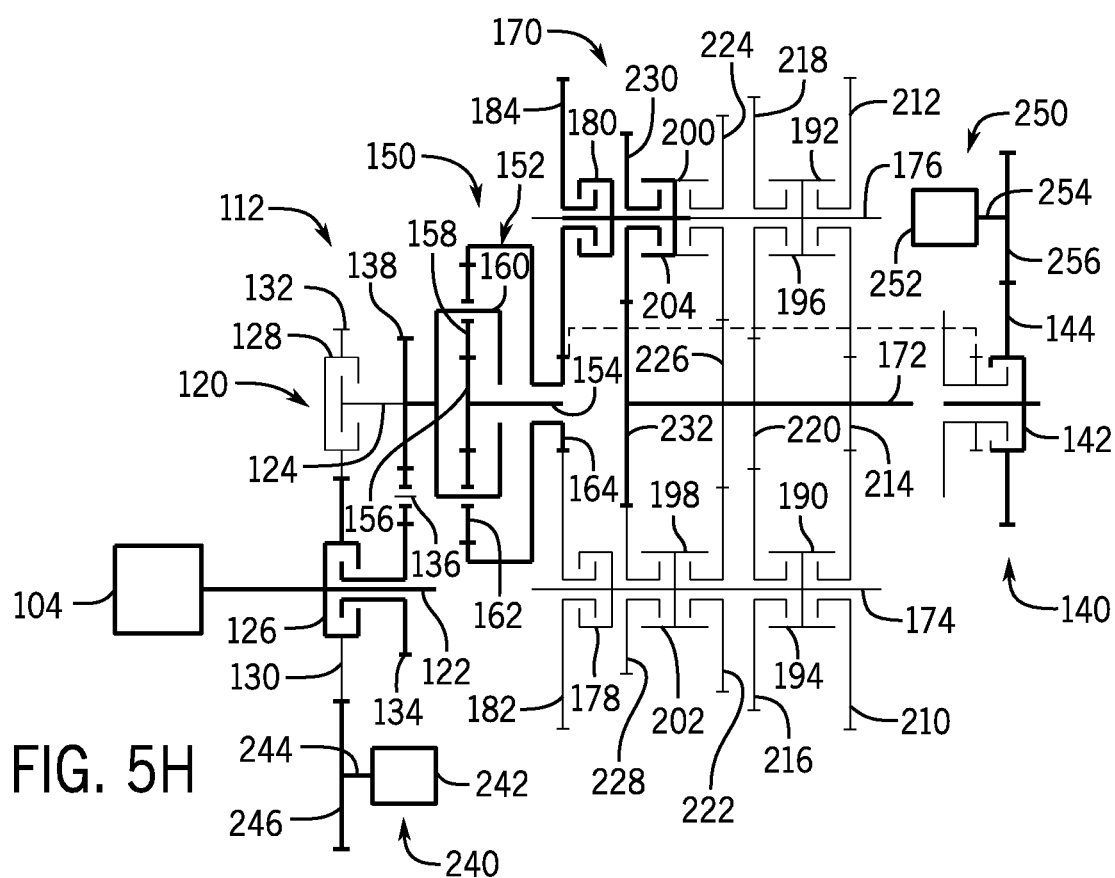

Generally, the reverse modes have the same clutch configurations and overall power flows as the forward modes, except that the reverse clutch 126 is engaged instead of the forward clutch 128 in each of the respective modes to reverse the rotational direction. For example, in the first reverse mode, the reverse clutch 126, the first power shift clutch 178, and the first speed clutch 190 are engaged, and the remaining clutches 128, 180, 192, 194, 196, 198, 200, 202 are disengaged. As such, in the first reverse mode and as reflected in FIG. 5A, the input assembly 120 receives the power from the engine 104, which flows through the reverse clutch 126, across input countershaft 122, and via gears 134, 136, 138, to the variator 150 at the carrier 160 of the planetary gear set 152. Power from the engine 104 also flows through the second element of the reverse clutch 126 via gear 130 to the first CVP assembly 240 via gear 246, which operates to drive the CVM 242, thereby enabling generation of electrical power. Additionally, the variator 150 may receive power from the second CVP assembly 250 via gears 256, 144 and the variator shaft 154 at the sun gear 156. The power flows from the input assembly 120 and the second CVP assembly 250 are combined at the variator 150 in the planetary gear set 152 and output from the variator 150 via the ring gear 162 to the power shift assembly 170. The power flows into the power shift assembly 170 at the first power shift clutch 178 via gears 164, 182, to the first power shift countershaft 174, and across the first speed clutch 190 to the output shaft 172 via gears 210, 214. The remaining reverse modes are depicted in FIGS. 5B-5H and have power flows similar to those in FIGS. 4B-4H, respectively, except the engagement of the reverse clutch 126 instead of the forward clutch 128.

As such, in addition to the creeper mode, the transmission 112 noted above provides eight forward modes and eight reverse modes in an arrangement that incorporates CVMs 242, 252, particularly motors that may provide savings with respect to cost and space. The transmission 112 accomplishes this with a power shift assembly 170 that has more flexibility with shifts between modes as compared with synchronous transmissions. Although the clutches 178, 180, 190, 192, 194, 196, 198, 200, 202, 204 of the power shift assembly 170 have some ability to absorb energy from gears at different speeds, the power shift assembly 170 described herein provides an architecture with smaller and more consistent steps between shifts, as well as with fewer gears and clutches than conventional power shift arrangements. In support, the example ratios of the various modes for the transmission 112 are listed in Table (1) below:

TABLE 1

| Mode (Forward and Reverse) | Input Ratio | Speed Clutch Ratio | Overall Ratio | Ratio Step Delta | % Ratio Step Delta |
| --- | --- | --- | --- | --- | --- |
| First | 1.543 | 3.036 | 4.686 | | |
| Second | 1.283 | 2.656 | 3.407 | 1.279 | 37.5% |
| Third | 1.543 | 1.657 | 2.558 | 0.849 | 33.2% |
| Fourth | 1.283 | 1.487 | 1.907 | 0.651 | 34.1% |
| Fifth | 1.543 | 0.942 | 1.454 | 0.453 | 31.1% |
| Sixth | 1.283 | 0.875 | 1.122 | 0.332 | 29.6% |
| Seventh | 1.543 | 0.574 | 0.885 | 0.237 | 26.8% |
| Eighth | 1.283 | 0.542 | 0.695 | 0.19 | 27.4% |

As shown, the power shift assembly 170 provides a configuration with uniform or near-uniform steps (e.g., in overall or absolute terms from step to step), such as within one or two percent, between modes (e.g., from one step or shift to the next, as reflected by comparisons between consecutive % Ratio Step Delta values of Table (1)). Generally, examples described herein may provide a power shift assembly with a gear ratio step delta that varies by less than ten percent, although in some examples, the gear ratio step delta may vary by less than five percent, including such values for all shifts and/or for consecutive shifts The gear ratios effected by the gears are closely constrained, such as near or within 1.5 or within 2.0 between successive speed gears (e.g., from one step or shift to the next, as reflected by comparisons between consecutive Overall Ratio values of Table (1)). The closely constrained shift steps reduce or avoid large torque spikes between operating modes, which, as noted above, aids in reducing the requirements of the electric machines. Additionally, the power shift assembly 170 described herein provides a gear ratio step delta that decreases as speed increases, thereby enabling fewer shifts at low speed and better control at higher speeds. As such, the transmission 112 provides electric machines (e.g., CVMs 242, 252) and power shift and speed clutches (e.g., clutches 178, 180, 190, 192, 194, 196, 198, 200, 202, 204) in a power shift assembly 170 that provides shifts within desired step values.

In addition to the modes discussed above, the transmission 112 may have further arrangements or modes for operation, particularly with respect to the relationships between the engine 104, first CVP assembly 240, and second CVP assembly 250. Generally, in the discussion above, the engine 104 selectively provides power to the transmission 112, which additionally drives the first CVM 242 of the first CVP assembly 240, and the transmission 112 is further selectively provided power from the second CVM 252 of the second CVP assembly 250. In further examples, the transmission 112 may provide input power to the second CVM 252 of the second CVP assembly 250, and/or the transmission 112 may receive input power from the first CVM 242 of the first CVP assembly 240. Similarly, in some modes (e.g., a starter or assist mode), the engine 104 may receive power from the first or second CVM 242, 252.

Additionally, and referring to the description of the modes described above, the power shift assembly 170 described herein may provide further advantages with respect upshifting and downshifting between modes. In particular, in some examples, only the power shift clutches 178, 180 are required to absorb engine power during upshift and down shift. For example, when in the third forward mode, the first power shift clutch 178 and the third speed clutch 194 are engaged. Regardless of increasing or decreasing speed, at a subsequent shift point, the first power shift clutch 178 is opened and the second power shift clutch 180 is engaged (with the second or fourth speed clutch 192, 196 preselected for engagement, depending on speed), thereby enabling the power shift clutches 178, 180 to be sized or otherwise designed to absorb engine power while the speed clutches 190, 192, 194, 196, 198, 200, 202, 204 are only required to accommodate the inertia of the respective rotating shaft on which they are mounted.

ENUMERATED EXAMPLES

The following examples of transmission for a work vehicle are further provided and numbered for ease of reference.

1. A transmission for a work vehicle including: an input assembly having directional clutches and configured to receive rotational power from an engine of the work vehicle; an electric machine; a variator including only a single planetary set configured to selectively receive rotational power from the electric machine and from the input assembly; a power shift assembly configured to receive rotational power from the variator, the power shift assembly comprising: parallel countershafts including a first countershaft and a second countershaft; an output shaft parallel with the countershafts; speed gears carried by the countershafts and the output shaft; and power shift clutches configured to dissipate energy from asynchronous gear meshing, the power shift clutches including a first power shift clutch carried by the first countershaft and a second power shift clutch carried by the second countershaft; wherein the power shift assembly is configured to effect multiple different rotational power flows from meshing a set of the speed gears at each shift of the power shift assembly to effect a unique one of multiple gear ratios, including: a first of the multiple different rotational power flows flowing through the first power shift clutch and the first countershaft without flowing through the second power shift clutch and the second countershaft; and a second of the multiple different rotational power flows flowing through the second power shift clutch and the second countershaft without flowing through the first power shift clutch and the first countershaft.

2. The transmission of example 1, wherein each consecutive shift of the power shift assembly has a gear ratio step delta that varies by less than ten percent.

3. The transmission of example 1, wherein each consecutive shift of the power shift assembly has a gear ratio step delta that varies by less than five percent.

4. The transmission of example 1, wherein each consecutive shift of the power shift assembly has a gear ratio step delta that decreases as speed increases.

5. The transmission of example 1, wherein the power shift assembly has only eight speed gears and is configured to provide exactly eight split-path speed modes of combined power from the engine and the electric machine.

6. The transmission of example 5, wherein the input assembly includes a creeper mode and wherein the creeper mode is effected by a creeper gear that is configured to receive rotational power exclusively from the electric machine.

7. The transmission of example 6, wherein the creeper mode is bi-directional being operable in forward and reverse directions and effected by a synchronous shift.

8. The transmission of example 1, wherein the planetary set includes a carrier, a sun gear and a ring gear; wherein the sun gear is configured to receive rotational power to or from the electric machine; wherein the carrier is configured to receive rotational power to or from the engine through the input assembly; and wherein the ring gear provides rotational power to the power shift assembly.

9. The transmission of example 1, wherein the electric machine is a first electric machine and the transmission further comprises a second electric machine being rotational tied to the engine through the input assembly and configured to receive rotational power from the engine.

10. The transmission of example 1, wherein the first electric machine is electrically coupled to the second electric machine.

11. A transmission for a work vehicle comprising: an input assembly having directional clutches and configured to receive rotational power from an engine of the work vehicle; an electric machine; a variator including only a single planetary set configured to selectively receive rotational power from the electric machine and from the input assembly, the variator configured to sum rotational power from the electric machine and the engine to provide a split-path rotational power; a power shift assembly configured to receive the split-path rotational power from the variator, the power shift assembly comprising: parallel countershafts including a first countershaft and a second countershaft; an output shaft parallel with the countershafts; speed gears carried by the countershafts and the output shaft; and power shift clutches configured to dissipate energy from asynchronous gear meshing, the power shift clutches including a first power shift clutch carried by the first countershaft and a second power shift clutch carried by the second countershaft; wherein the power shift assembly is configured to effect multiple different rotational power flows from meshing a set of the speed gears at each shift of the power shift assembly to effect a unique one of multiple gear ratios, including: a first of the multiple different rotational power flows flowing through the first power shift clutch and the first countershaft without flowing through the second power shift clutch and the second countershaft; and a second of the multiple different rotational power flows flowing through the second power shift clutch and the second countershaft without flowing through the first power shift clutch and the first countershaft.

12. The transmission of example 11, wherein each consecutive shift of the power shift assembly has a gear ratio step delta that varies by less than ten percent.

13. The transmission of example 11, wherein each consecutive shift of the power shift assembly has a gear ratio step delta that decreases as speed increases, 14. The transmission of example 11, wherein the input assembly has only eight speed gears and is configured to provide exactly eight split-path speed modes; and wherein the power shift assembly includes a creeper mode.

15. The transmission of example 12, wherein the planetary set includes a single carrier, a single sun gear and a single ring gear, wherein the sun gear is configured to receive rotational power to or from the electric machine, the carrier is configured to receive rotational power to or from the engine through the input assembly, and the ring gear is configured to provide the split-path rotational power to the power shift assembly.

CONCLUSION

The foregoing describes one or more examples of a transmission arrangement suitable for use in work vehicles in which engine and electric power sources are utilized to provide split-path power for tractive or other use in the work vehicle in a number of discreet operational modes. Varying the electric machine varies the power band of the operational modes. Power shift components allow asynchronous shifts and variable shift points between modes. Speed gears are mounted on multiple countershafts providing alternative power flow paths to the output. Various architectures are envisioned, including, two countershafts each with a single power shift clutch and, together with an output shaft, carrying eight speed gears proving eight forward and reverse speed modes. Other dual power flow path arrangements are contemplated, such as for six and ten forward and reverse speed modes. In each, the transmission arrangement is configured with closely constrained steps, such as within one 5 to 10 percent, between modes and to allow for a wide power band within each mode, permitting output speeds to double or near double from the low to high end of each mode. The gear ratios effected by the speed gears are closely constrained The transmission arrangement also provides a bilateral (forward and reverse) synchronous creeper mode.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A transmission for a work vehicle comprising:
   an input assembly having directional clutches and configured to receive rotational power from an engine of the work vehicle;
   an electric machine;
   a variator including only a single planetary set configured to selectively receive rotational power from the electric machine and from the input assembly;
   a power shift assembly configured to receive rotational power from the variator, the power shift assembly comprising:
   parallel countershafts including a first countershaft and a second countershaft;
   an output shaft parallel with the countershafts;
   speed gears carried by the countershafts and the output shaft; and
   power shift clutches configured to dissipate energy from asynchronous gear meshing, the power shift clutches including a first power shift clutch carried by the first countershaft and a second power shift clutch carried by the second countershaft;
   wherein the power shift assembly is configured to effect multiple different rotational power flows from meshing a set of the speed gears at each shift of the power shift assembly to effect a unique one of multiple gear ratios, including:
   a first of the multiple different rotational power flows flowing through the first power shift clutch and the first countershaft without flowing through the second power shift clutch and the second countershaft; and
   a second of the multiple different rotational power flows flowing through the second power shift clutch and the second countershaft without flowing through the first power shift clutch and the first countershaft.

2. The transmission of claim 1, wherein each consecutive shift of the power shift assembly has a gear ratio step delta that varies by less than ten percent.

3. The transmission of claim 1, wherein each consecutive shift of the power shift assembly has a gear ratio step delta that varies by less than five percent.

4. The transmission of claim 1, wherein each consecutive shift of the power shift assembly has a gear ratio step delta that decreases as speed increases.

5. The transmission of claim 1, wherein the power shift assembly has only eight speed gears and is configured to provide exactly eight split-path speed modes of combined power from the engine and the electric machine.

6. The transmission of claim 5, wherein the input assembly includes a creeper mode, and wherein the creeper mode is effected by a creeper gear that is configured to receive rotational power exclusively from the electric machine.

7. The transmission of claim 6, wherein the creeper mode is bi-directional being operable in forward and reverse directions and effected by a synchronous shift.

8. The transmission of claim 1, wherein the planetary set includes a carrier, a sun gear and a ring gear;
   wherein the sun gear is configured to receive rotational power to or from the electric machine;
   wherein the carrier is configured to receive rotational power to or from the engine through the input assembly; and
   wherein the ring gear provides rotational power to the power shift assembly.

9. The transmission of claim 1, wherein the electric machine is a first electric machine and the transmission further comprises a second electric machine being rotational tied to the engine through the input assembly and configured to receive rotational power from the engine.

10. The transmission of claim 9, wherein the first electric machine is electrically coupled to the second electric machine.

11. The transmission of claim 1, wherein the directional clutches of the input assembly include a forward clutch and a reverse clutch.

12. A transmission for a work vehicle comprising:
    an input assembly having directional clutches and configured to receive rotational power from an engine of the work vehicle;
    an electric machine;
    a variator including only a single planetary set configured to selectively receive rotational power from the electric machine and the input assembly, the variator configured to sum rotational power from the electric machine and from the engine to provide a split-path rotational power;
    a power shift assembly configured to receive the split-path rotational power from the variator, the power shift assembly comprising:
    parallel countershafts including a first countershaft and a second countershaft;
    an output shaft parallel with the countershafts;
    speed gears carried by the countershafts and the output shaft; and
    power shift clutches configured to dissipate energy from asynchronous gear meshing, the power shift clutches including a first power shift clutch carried by the first countershaft and a second power shift clutch carried by the second countershaft;
    wherein the power shift assembly is configured to effect multiple different rotational power flows from meshing a set of the speed gears at each shift of the power shift assembly to effect a unique one of multiple gear ratios, including:
    a first of the multiple different rotational power flows flowing through the first power shift clutch and the first countershaft without flowing through the second power shift clutch and the second countershaft; and
    a second of the multiple different rotational power flows flowing through the second power shift clutch and the second countershaft without flowing through the first power shift clutch and the first countershaft.

13. The transmission of claim 12, wherein each consecutive shift of the power shift assembly has a gear ratio step delta that varies by less than ten percent.

14. The transmission of claim 12, wherein each consecutive shift of the power shift assembly has a gear ratio step delta that varies by less than five percent.

15. The transmission of claim 12, wherein each consecutive shift of the power shift assembly has a gear ratio step delta that decreases as speed increases.

16. The transmission of claim 12, wherein the power shift assembly has only eight speed gears and is configured to provide exactly eight split-path speed modes.

17. The transmission of claim 16, wherein the input assembly includes a creeper mode, and wherein the creeper mode is effected by a creeper gear that is configured to receive rotational power exclusively from the electric machine and is bi-directional being operable in forward and reverse directions and effected by a synchronous shift.

18. The transmission of claim 12, wherein the planetary set includes a single carrier, a single sun gear and a single ring gear, wherein the sun gear is configured to receive rotational power to or from the electric machine, the carrier is configured to receive rotational power to or from the engine through the input assembly, and the ring gear is configured to provide the split-path rotational power to the power shift assembly.

19. The transmission of claim 12, wherein the electric machine is a first electric machine and the transmission further comprises a second electric machine being rotationally tied to the engine through the input assembly and configured to receive rotational power from the engine.

20. The transmission of claim 19, wherein the first electric machine is electrically coupled to the second electric machine.

* * * * *